US012314699B2

(12) United States Patent
Nagano

(10) Patent No.: US 12,314,699 B2
(45) Date of Patent: May 27, 2025

(54) SOFTWARE QUERY INFORMATION MANAGEMENT SYSTEM AND SOFTWARE QUERY INFORMATION MANAGEMENT METHOD

(71) Applicant: HITACHI, LTD., Tokyo (JP)

(72) Inventor: Takehiko Nagano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 910 days.

(21) Appl. No.: 17/374,511

(22) Filed: Jul. 13, 2021

(65) Prior Publication Data

US 2022/0035621 A1 Feb. 3, 2022

(30) Foreign Application Priority Data

Jul. 28, 2020 (JP) ................. 2020-126962

(51) Int. Cl.
*G06F 8/65* (2018.01)
*G06F 8/10* (2018.01)
(Continued)

(52) U.S. Cl.
CPC ............... *G06F 8/65* (2013.01); *G06F 8/10* (2013.01); *G06F 8/70* (2013.01); *G06F 8/71* (2013.01);
(Continued)

(58) Field of Classification Search
CPC ..... G06F 8/65; G06F 8/10; G06F 8/70; G06F 8/71; G06F 11/3664; G06Q 30/018; H04L 67/12; H04W 4/40
See application file for complete search history.

(56) References Cited

U.S. PATENT DOCUMENTS 10,703,383 B1* 7/2020 Chan .................. G07C 5/008
10,824,415 B1* 11/2020 Fields .................. G06F 8/65
(Continued)

FOREIGN PATENT DOCUMENTS

JP 2005-173761 A 6/2005
JP 2014-130547 A 7/2014
JP 2017-220135 A 12/2017

OTHER PUBLICATIONS

Ilarri, Sergio, Thierry Delot, and Raquel Trillo-Lado. "A data management perspective on vehicular networks." IEEE Communications Surveys & Tutorials 17.4 (2015): 2420-2460. (Year: 2015).*

(Continued)

*Primary Examiner* — Corey Russ
(74) *Attorney, Agent, or Firm* — MATTINGLY & MALUR, PC

(57) ABSTRACT

A software query information management system is configured to associate a required device specification with a regulation ID of a regulation defining a requirement for receiving legal approval for a vehicle and store the required device specification in association with the regulation ID, identify the regulation ID associated with the required device specification associated with traceability information of the device associated with the required device specification, generate software query information in which the identified regulation ID is associated with one or more software IDs included in the traceability information, identify, based on the software query information, a software ID of other software associated with the regulation ID associated with a software ID of software embedded in the device in which an event has occurred, and generate evidence based on communication data of the device having embedded therein the software with the identified software ID.

12 Claims, 19 Drawing Sheets

(51) Int. Cl.
*G06F 8/70* (2018.01)
*G06F 8/71* (2018.01)
*G06F 11/3698* (2025.01)
*G06Q 30/018* (2023.01)

(52) U.S. Cl.
CPC ........ *G06Q 30/018* (2013.01); *G06F 11/3698* (2025.01)

(56) References Cited

U.S. PATENT DOCUMENTS

| | | | |
|---|---|---|---|
| 2005/0289399 A1* | 12/2005 | Kimura | G06F 11/3636 |
| | | | 714/45 |
| 2012/0226839 A1* | 9/2012 | Fuoco | G06F 11/348 |
| | | | 710/110 |
| 2014/0317604 A1* | 10/2014 | Gataullin | G06F 11/3003 |
| | | | 717/128 |
| 2016/0138934 A1* | 5/2016 | Kim | G01C 21/3697 |
| | | | 701/451 |
| 2016/0139834 A1* | 5/2016 | Hanson | H04L 67/1097 |
| | | | 711/114 |
| 2018/0211299 A1* | 7/2018 | Shehata | G06Q 30/0607 |
| 2020/0057630 A1 | 2/2020 | Cho et al. | |
| 2020/0073651 A1* | 3/2020 | Rodriguez Bravo | G06F 21/57 |
| 2020/0133263 A1* | 4/2020 | Decastro | G08G 1/048 |
| 2020/0143679 A1* | 5/2020 | Franke | G08G 1/0133 |
| 2020/0174779 A1* | 6/2020 | David | G06F 8/654 |
| 2021/0109746 A1* | 4/2021 | Brugman | H04L 9/0891 |
| 2021/0398441 A1* | 12/2021 | Fok | G09B 9/052 |

OTHER PUBLICATIONS

Chinese Office Action received in corresponding Chinese Application No. 202110784096.5 dated Sep. 27, 2024.

* cited by examiner

APPROVED SOFTWARE QUERY INFORMATION 21

| REGULATION ID (211) | SOFTWARE QUERY NUMBER (212) | SOFTWARE ID (213) | VERIFICATION DATA (214) | |
|---|---|---|---|---|
| R7902 | R7902001 | ECU-A v1.0<br>ECU-B v1.0<br>ECU-C v1.0 | VERIFICATION DATA A v1.0<br>VERIFICATION DATA B v1.0<br>VERIFICATION DATA C v1.0 | ~D21A |
| R13H | R13H001 | ECU-C v1.0 | VERIFICATION DATA C v1.0 | ~D21B |
| ⋮ | ⋮ | ⋮ | ⋮ | |

VEHICLE CONFIGURATION INFORMATION 24

FIG. 4A

TRACEABILITY INFORMATION 20

| SREQ4 v1.0 | REQ A-1 v1.0<br>REQ A-2 v1.0<br>REQ B-2 v1.0<br>REQ B-3 v1.0<br>REQ C-1 v1.0<br>REQ C-2 v1.0 |
|---|---|
| ⋮ | ⋮ |

TRACEABILITY INFORMATION 30

| FUNC A-1 v1.0 | DSN A-1 v1.0<br>DSN A-3 v1.0 |
|---|---|
| ⋮ | ⋮ |

30a

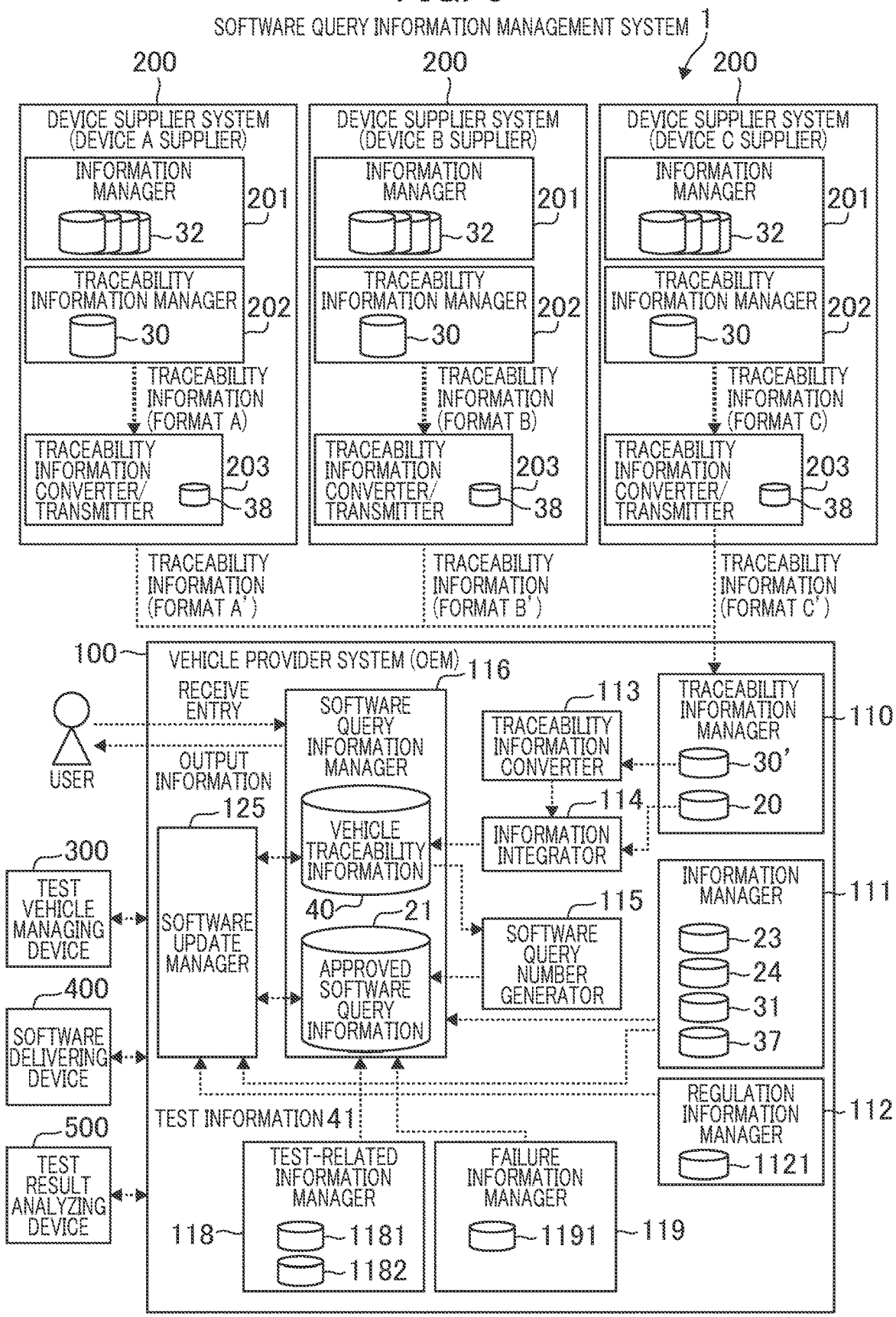

FIG. 6

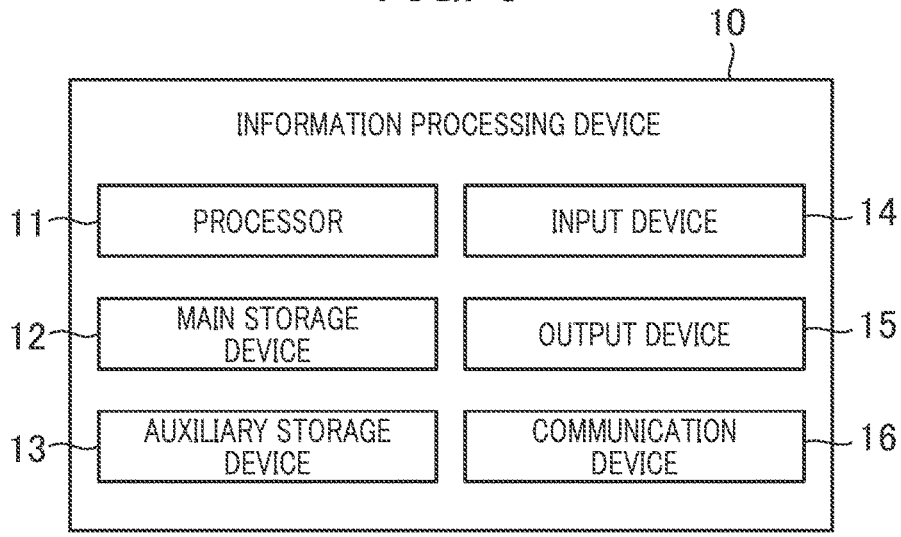

INFORMATION PROCESSING DEVICE — 10
- 11 — PROCESSOR
- 12 — MAIN STORAGE DEVICE
- 13 — AUXILIARY STORAGE DEVICE
- 14 — INPUT DEVICE
- 15 — OUTPUT DEVICE
- 16 — COMMUNICATION DEVICE

FIG. 7

TEST HISTORY INFORMATION 1181

| 811 | 812 | 813 | 814 | 815 | 816 | 817 | 818 |
|---|---|---|---|---|---|---|---|
| TEST ID | TEST DETAIL | TEST VEHICLE CONFIGURATION | SOFTWARE QUERY NUMBER | TOOL USED | TEST CONDUCTOR | TEST RESULT | EVIDENCE |
| TEST001 | EMERGENCY STOP | 010-003-001 | R79001 | HARNESS 001 SOFTWARE UPDATING UNIT 02 | HANAKO YAMADA | FAILED | LOG 001 LOG 002 PICTURE 12 |
| ⋮ | ⋮ | ⋮ | ⋮ | ⋮ | ⋮ | ⋮ | ⋮ |

FIG. 8

TEST VEHICLE INFORMATION 1182

| 821 | 822 | 823 |
|---|---|---|
| MODEL ID | VEHICLE NAME | PLACEMENT SITE |
| 010 | AAAAA | HOKKAIDO TEST COURSE |
| 020 | BBBBBB | IBARAKI DEVELOPMENT SITE |
| ⋮ | ⋮ | ⋮ |

FIG. 9

FAILURE INFORMATION 1191

| 911 | 912 | 913 | 914 | 915 | 916 | 917 | 918 | 919 |
|---|---|---|---|---|---|---|---|---|
| FAILURE ID | DATE AND TIME | VEHICLE ID | VEHICLE NAME | MODEL ID | MOTOR TYPE | DETAIL | DEVICE NAME | DEVICE ID |
| 1 | 2018/09/01 10:15:30 | 1A1AAA1A_AA123456 | SEDAN A | 010 | AA1 | AUTOMATIC DRIVING FAILED BRAKE | AD-ECU | AD01 |
| 2 | 2018/09/02 14:35:40 | 1A1AAA1A_AA123123 | SEDAN A | 010 | AA1 | AUTOMATIC DRIVING FAILED BRAKE | AD-ECU | AD02 |
| : | : | : | : | : | : | : | : | : |
| N | 2018/09/15 17:55:40 | 1D1DDD1A_BC123122 | MINIVAN x | 020 | BB3 | AUTOMATIC DRIVING FAILED OBJECT DETECTED | AD-ECU | AD01 |

| 921 | 922 | 923 | 924 | 925 | 926 | 927 |
|---|---|---|---|---|---|---|
| SOFTWARE NAME | SOFTWARE ID | TRAVEL DISTANCE (km) | TRAVEL ROUTE | FAILURE-REVEALED POINT | WEATHER | SUPPLEMENTARY INFORMATION |
| app1 | app1-10 | 50,000 | YOKOHAMA → HAKONE | ODAWARA | RAINY | DRIVE RECORDER, GPS DATA PRESENT |
| app1 | app1-11 | 38,000 | WARABI → SENDAI | MITO | CLOUDY | NONE |
| : | : | : | : | : | : | : |
| app1 | app1-1.0 | 1,000 | HAKODATE → ASAHIKAWA | SAPPORO | SUNNY | SOFTWARE LOG PRESENT |

FIG. 11
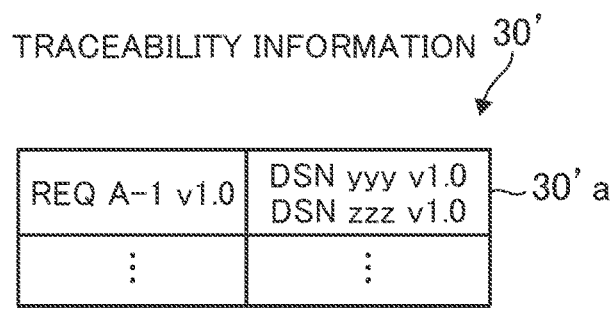
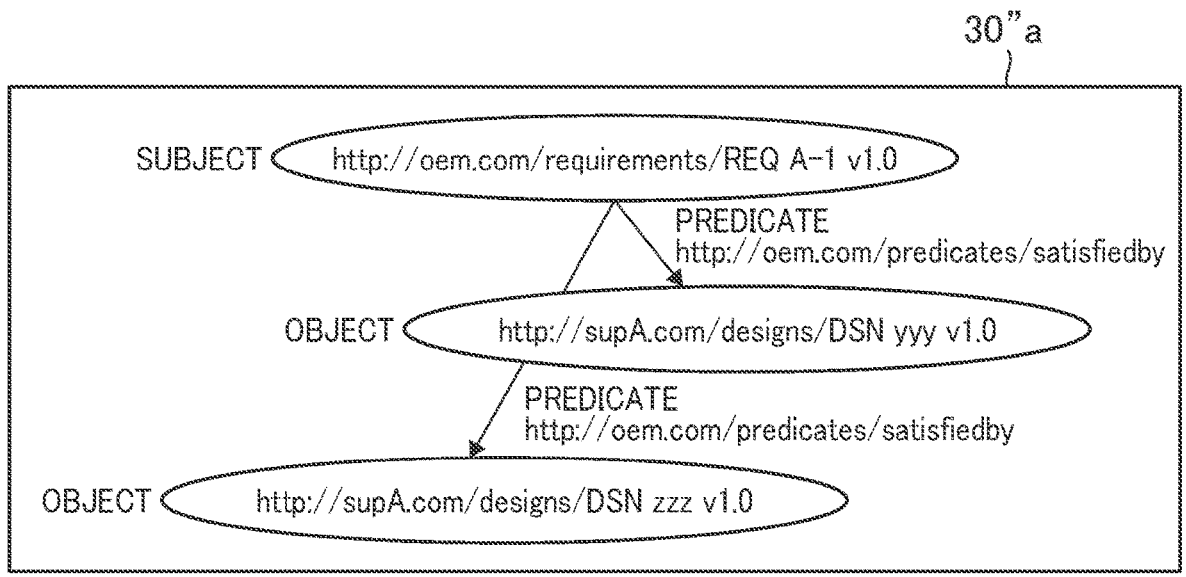
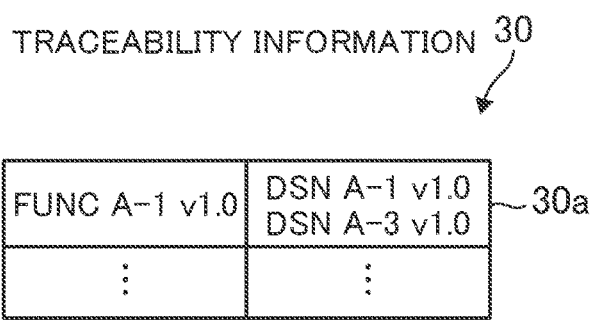

FIG. 15

```
┌─────────────────────────────────────────────────────┐ ─1500
│              <RELATED INFORMATION QUERY>            │
│  ┌───────────────────────────────────────────────┐  │ ─1511
│  │ PLEASE ENTER MODEL ID AND KEY INFORMATION     │  │
│  │            AND PRESS SEARCH BUTTON            │  │
│  │                                               │  │
│  │   MODEL ID       [ ****                    ]  │  │
│  │                                               │  │
│  │   KEY INFORMATION [ FUNCTION NAME = FUNC ZZZ ]│  │
│  │   (EXAMPLE: SOFTWARE ID, FUNCTION NAME,       │  │
│  │              REGULATION ID, AND THE LIKE)     │  │
│  │          [         SEARCH         ] ─15111    │  │
│  └───────────────────────────────────────────────┘  │
```

<SEARCH RESULTS> — 1512

MODEL ID: MODEL Z / MODEL Y

| REGULATION ID | SOFTWARE QUERY NUMBER | SOFTWARE ID | VEHICLE REQUIREMENT | ... | ELIGIBILITY VERIFICATION RESULT REPORT |
|---|---|---|---|---|---|
| R13H<br>R7902 | R13H001<br>R7902001 | ECU A v1.0<br>ECU B v1.0<br>ECU C v1.0 | SREQ4<br>SREQ5<br>SREQ6 | ... | TRPREQ13-1<br>TRPREQ79-1<br>TRPREQ79-2 |

<TEST-RELATED INFORMATION DISPLAY FIELD> — 1513

- TEST DETAIL : EMERGENCY STOP
- TEST CONDUCTOR : HANAKO YAMADA
- TEST VEHICLE : AAAAA          [RESERVE VEHICLE] — 15131
- PLACEMENT SITE : HOKKAIDO TEST COURSE
- TEST VEHICLE CONFIGURATION : 010-033-001
- TOOL USED : HARNESS 001, SOFTWARE UPDATING UNIT 02   [RESERVE TOOL] — 15132
- FAILURE INFORMATION : AUTOMATIC DRIVING FAILED, BRAKE FAILED ...   [SETUP] — 15133

<MENUS> — 1514

- REGISTER INFORMATION    [REGISTER] — 15141
- GENERATE EVIDENCE       [GENERATE] — 15142

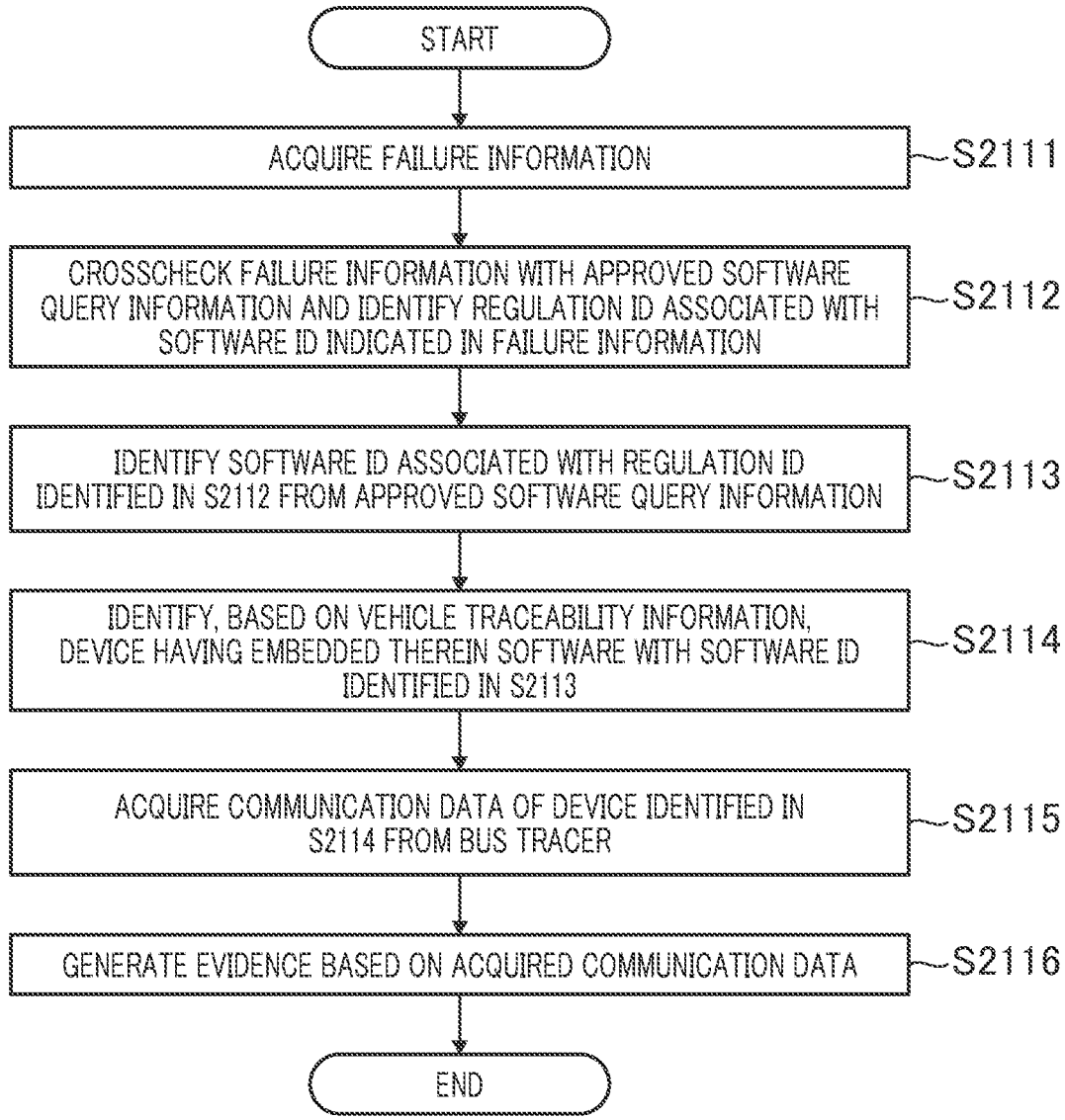

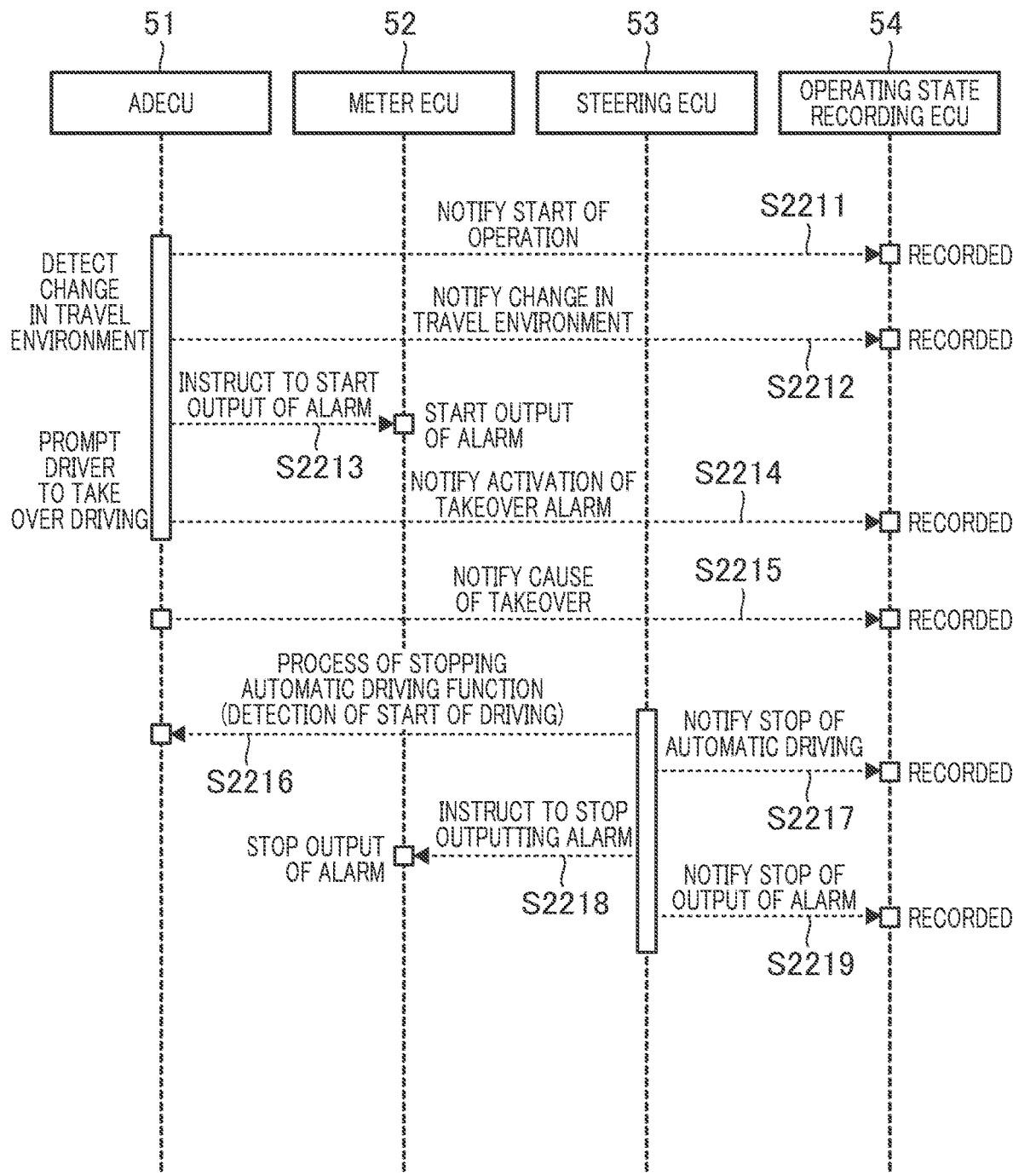

FIG.23

EXAMPLE OF COMMUNICATION DATA ACQUIRED BY BUS TRACER

⋮

[ADECU] [2020-07-14 11:46:00] 1:AUTODRIVE START RECORDED
[RCECU] [2020-07-14 11:46:05] 1:AUTODRIVE START NOTIFY
[ADECU] [2020-07-14 11:46:10] 2:STATE CHANGE RECORDED
[RCECU] [2020-07-14 11:46:20] 2:STATE CHANGE NOTIFY
[MTECU] [2020-07-14 11:46:52] 3:DRIVESWITCH ALARM NOTIFY
[ADECU] [2020-07-14 11:46:55] 3:DRIVESWITCH ALARM DISPLAYED
[RCECU] [2020-07-14 11:47:02] 4:UNDER DRIVESWITCH NOTIFY
[ADECU] [2020-07-14 11:47:05] 4:UNDER DRIVESWITCH RECORDED
[RCECU] [2020-07-14 11:47:15] 5:DRIVESWITCH CAUSE NOTIFY
[ADECU] [2020-07-14 11:47:18] 5:DRIVESWITCH CAUSE RECORDED
[ADECU] [2020-07-14 11:47:50] 6:AUTODRIVE STOP NOTIFY
[STECU] [2020-07-14 11:47:55] 6:AUTODRIVE STOP ACCEPTED
[RCECU] [2020-07-14 11:48:10] 7:MANUALDRIVE START NOTIFY
[STECU] [2020-07-14 11:48:13] 7:MANUARLDRIVE START RECORDED

⋮

SOFTWARE QUERY INFORMATION MANAGEMENT SYSTEM AND SOFTWARE QUERY INFORMATION MANAGEMENT METHOD

CROSS-REFERENCE TO RELATED APPLICATION

This application claims priority pursuant to Japanese patent application No. 2020-126962, filed on Jul. 28, 2020, the entire disclosure of which is incorporated herein by reference.

BACKGROUND

Technical Field

The present invention relates to a software query information management information system and a software query information management method.

Related Art

Japanese Unexamined Patent Application Publication No. 2005-173761 describes a vehicle design supporting device configured to solve a problem that requires a lot of effort to check whether design conforms to laws and regulations. The vehicle design supporting device includes a law and regulation information storage unit that stores, for each of members attached to a vehicle, information on laws and regulations relating to the member, a unit that inputs vehicle shape information defining a shape of the vehicle, a unit that inputs member shape information defining shapes of the members attached to the vehicle and attachment positions of the members, a determiner that reads member-related law and regulation information on the members from the law and regulation information storage unit and determines whether the members satisfy a regulatory condition included in the member-related law and regulation information, and an output unit that changes display forms of the members based on results of the determination by the determiner and displays the members in the display forms.

Japanese Unexamined Patent Application Publication No. 2014-130547 describes a file management device configured to identify a range affected by a change and including up to a file portion. The file management device incudes a storage unit that stores an association relationship between information identifying a first portion of a file in a first tabular form and information identifying a second portion of a file in a second tabular form, and a controller that references the storage unit upon receiving a request to search for an affected range of the first portion, extracts the information identifying the second portion and associated with the information identifying the first portion, and outputs, as a response to the search request, the information identifying the second portion and information identifying the file that includes the second portion and is in the second tabular format.

Japanese Unexamined Patent Application Publication No. 2017-220135 describes an in-vehicle device log collection system configured to efficiently acquire, from in-vehicle devices that have been distributed and are tested and under development, log information required by a developer without excess or deficiency. The in-vehicle device log collection system includes a log management device and an in-vehicle log collection device. The log management device transmits, to the in-vehicle log collection device, a condition for extracting, from log information of an in-vehicle device, summary information to be analyzed on a priority basis, and an analysis script with an instruction to transmit the extracted summary information to the log management device, and extracts, from the summary information, log information when a failure has occurred in the in-vehicle device. The in-vehicle log collection device extracts summary information from log information based on the analysis script and transmits, to the log management device, the extracted summary information and a time point when the failure has occurred.

Recently, with the progress of wireless communication techniques, a vehicle provider such as an automobile manufacturer can embed software in a device such as an electronic control unit (ECU) mounted in a vehicle via Over-the-Air (OTA) computation and update (a change in performance, a change in a function, the addition of a function, and the like) the software during manufacturing of the vehicle and after sales. Therefore, for example, the vehicle provider can develop, produce, and sell a vehicle in consideration of addition of a future automatic driving function and the like. It is considered that the number of opportunities to update software installed in a vehicle will rapidly increase in the future.

Under the foregoing circumstances, international standards for software updates are being developed in the World Forum for Harmonization of Vehicle Regulations (WP29). In WP29, for example, the following systems are considered to be established. The systems are a system for evaluating an effect of a software update on type approval of a vehicle and making a document of the result of the evaluation, a system for providing a report to an authority (Ministry of Land, Infrastructure, Transport, and Tourism or the like) when a software update affects a detail of type approval that a vehicle has already received, a system for introducing a concept (hereinafter referred to as "software query numbers") defining aggregated numbers distinguished based on versions of software embedded in an in-vehicle system that has received type approval, a system for submitting information such as evidence relating to a software update in accordance with a request from the authority, and the like.

When the foregoing systems are started, a vehicle provider needs to give software query numbers based on software embedded in many devices mounted in a vehicle, analyze an effect of updates of the software on type approval, and efficiently and reliably acquire evidence and the like that need to be reported for type approval.

However, many of the devices mounted in the vehicle are normally supplied from device suppliers or the like to the vehicle provider (OEM), and information on the software, such as traceability information, is managed by the suppliers. Therefore, to support the foregoing systems, a complex operation is expected to be performed to associate information, managed by vehicle providers (OEMs), of type approval with the information on the software.

The vehicle design supporting device described in Japanese Unexamined Patent Application Publication No. 2005-173761 determines whether a member attached to a vehicle satisfies the regulatory condition included in the member-related law and regulation information. However, Japanese Unexamined Patent Application Publication No. 2005-173761 does not disclose a technique for comprehensively managing information managed by a device supplier and information managed by a vehicle provider.

In addition, the file management device described in Japanese Unexamined Patent Application Publication No. 2014-130547 identifies a range affected by a change and including up to a file portion. However, Japanese Unexamined Patent Application Publication No. 2014-130547 does not specifically describe analysis of an effect of a software update on type approval and a specific method for acquiring evidence that needs to be reported for type approval.

The in-vehicle device log collection system described in Japanese Unexamined Patent Application Publication No. 2017-220135 acquires log information required by a developer from in-vehicle devices that have been distributed and are tested and under development. However, Japanese Unexamined Patent Application Publication No. 2017-220135 does not disclose analysis of an effect of a software update on type approval and a specific method for acquiring evidence that needs to be reported for type approval.

SUMMARY

The present invention has been made under the foregoing circumstances. An object of the present invention is to provide a software query information management system and a software query information management method that can efficiently manage information on legal approval for software to be embedded in a device mounted in a vehicle and efficiently acquire and provide information required by a user.

To achieve the foregoing object, according to an aspect of the present invention, an information processing system manages information on legal approval for software configured to achieve a function of a device mounted in a vehicle. The information processing system is configured to associate a required device specification that is information on a specification required for the device in accordance with a regulation with a regulation ID that is information identifying the regulation defining a requirement for receiving legal approval for the vehicle, and store the required device specification in association with the regulation ID. The information processing system is also configured to acquire traceability information that is information on traceability of the device associated with the required device specification and includes a software ID identifying software embedded in the device, generate software query information in which the regulation ID associated with the required device specification associated with the acquired traceability information is associated with the one or more software IDs, and store event information on an event that has occurred in the device. The event information includes information in which information identifying the device in which the event has occurred is associated with the software ID of the software configured to achieve the function of the device. The information processing system is also configured to identify, based on the software query information, the software ID of the other software associated with the regulation ID associated with the software ID included in the event information, identify, based on the traceability information, the device having embedded therein the software with the identified software ID, acquire communication data including a detail of communication executed between the identified device and another device, and generate, based on the communication data, evidence necessary to receive the legal approval.

The problems disclosed herein and a method for solving the problems will be clarified from the following detailed description of embodiments of the present invention and the drawings.

According to the present invention, it is possible to efficiently manage information on legal approval for software embedded in a device mounted in a vehicle and efficiently acquire and provide information required by a user.

BRIEF DESCRIPTION OF THE DRAWINGS

FIGS. 4A and 4B illustrate examples of traceability information.

FIG. 5 is a diagram illustrating a schematic configuration of a software query information management system.

FIG. 6 illustrates an example of an information processing device constituting the software query information management system.

FIG. 7 illustrates an example of test history information.

FIG. 8 illustrates an example of test vehicle information.

FIG. 9 illustrates an example of failure information.

FIG. 11 is a diagram describing traceability information and the conversion of the traceability information.

FIG. 15 illustrates an example of related information query screen.

FIG. 21 is a flowchart of an evidence generation process

FIG. 22 is a flowchart of a communication data acquisition process.

FIG. 23 illustrates communication data.

DESCRIPTION OF EMBODIMENTS

Figure 1:
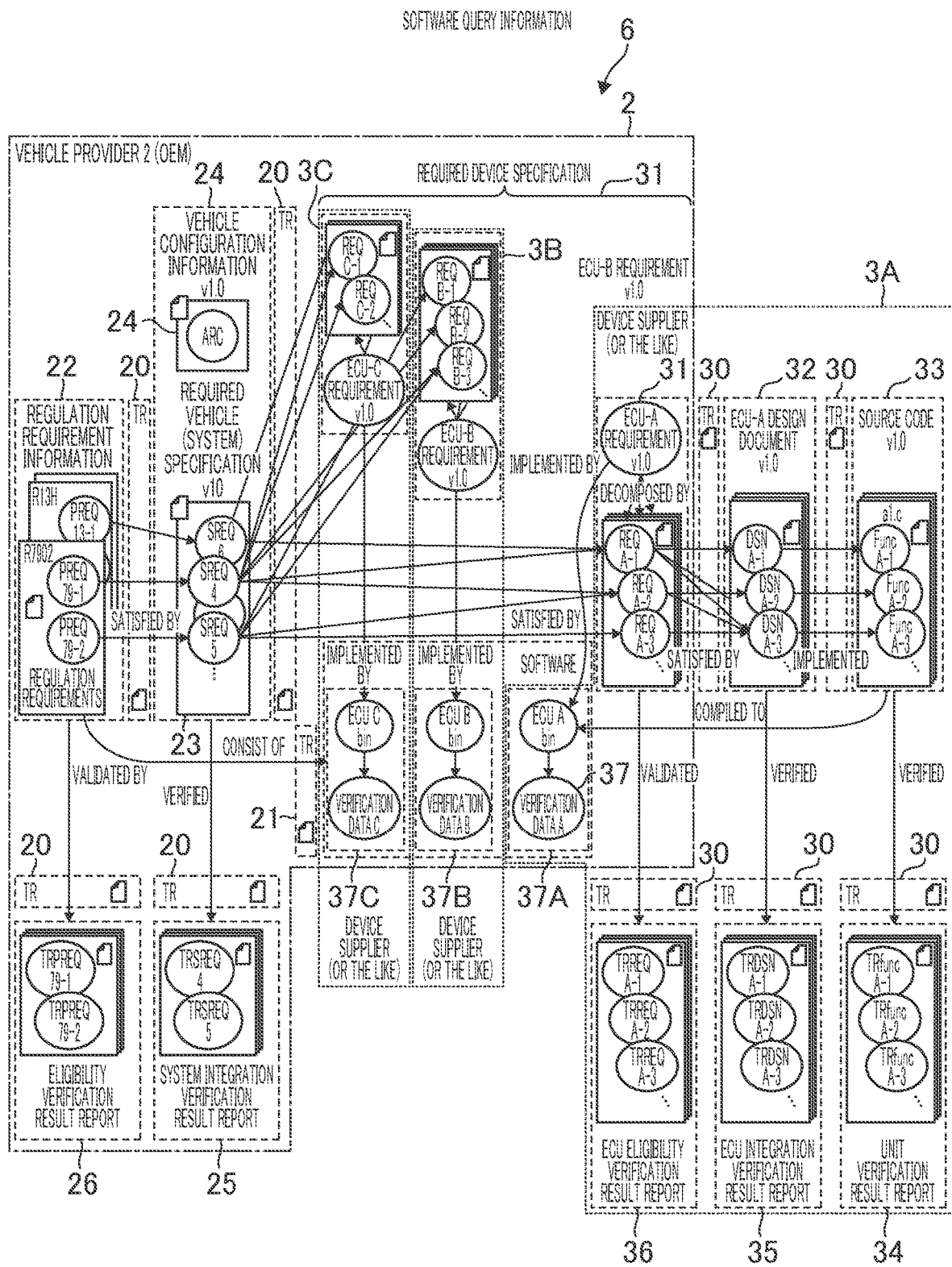
FIG. 1 is a diagram describing software query information.

Hereinafter, an embodiment of the present invention is described with reference to the drawings. In the following description, the same reference sign is given to the same or similar configurations, and a duplicate description of the same or similar configurations is omitted in some cases. In addition, a common reference sign is given to a plurality of sections having a common configuration, and a character such as an alphabet is given to the reference sign in order to distinguish the sections from each other in some cases.

In the following description, a "regulation" indicates a regulation (law, cabinet order, rule, or the like) that must be complied with in order to receive authentication (approval) on whether a vehicle satisfies a security standard such as type approval. In addition, the regulation is not limited to a Japanese regulation and includes a regulation in an export destination (destination country) of the vehicle.

In the following description, "software" indicates a control command written to an information processing device such as an electronic control unit (ECU) and data required to execute the control command.

In the following description, "embedding software in a device" indicates recording (storing, writing, downloading, or the like) the software in a storage component of the device. In addition, in the following description, "managing information" indicates storing the information in a database or the like and managing the information in a state in which operations of searching for, updating, and deleting the information and other operations can be executed.

In the following description, "evidence" indicates a related document that is a test result, a software execution result (execution log or the like), a review result, and the like and is to be submitted to an authority (Ministry of Land, Infrastructure, Transport, and Tourism or the like) by a vehicle provider to receive type approval or the like.

In the following description, a provider (vehicle manufacturer such as an automobile manufacturer, a designer, a responsible person of a legal department, or the like (OEM)) of a vehicle is referred to as vehicle provider. In addition, a supplier of a device (ECU or the like) to be mounted in the vehicle, a supplier of a server device or the like that coordinates with the vehicle outside the vehicle, and the like is referred to as "device suppliers". However, the vehicle provider (OEM) and the device suppliers are just entities defined for convenience of explanation. Entities that manage and operate various configurations described later are not necessarily limited.

The following assumes that information that is generated by an entity that is not clearly specified is set by a user input operation or by an existing information processing system.

Software Query Information

Information (hereinafter referred to as "software query information 6") that is managed by the vehicle provider and a device supplier for software that is embedded in a device that is mounted in the vehicle and is an ECU or the like is described below.

FIG. 1 is a diagram describing the software query information 6. As illustrated in FIG. 1, the software query information 6 includes approved software query information 21, regulation requirement information 22, a required vehicle specification 23, vehicle configuration information 24, a system integration verification result report 25, an eligibility verification result report 26, a required device specification 31, software 37, and traceability information 20, which are information that is managed by the vehicle provider 2. The software query information 6 includes a required device specification 31, a design document 32, a source code 33, a unit verification result report 34, an ECU integration verification result report 35, an ECU eligibility verification result report 36, the software 37, and traceability information 30, which are information that is managed by device suppliers 3A to 3C. The software query information 6 is managed for each of groups such as vehicle models. The present embodiment assumes that the software query information 6 is managed for each model.

Among the information illustrated in FIG. 1, the approved software query information 21 is information indicating associations between regulations by which approval has been given and software relating to the approval.

Figures 2, 3:
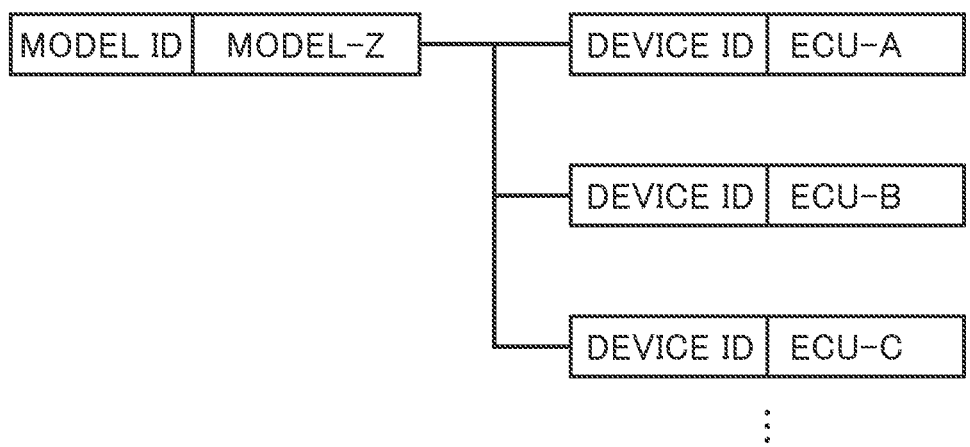
FIG. 2 illustrates an example of approved software query information.
FIG. 3 illustrates an example of vehicle configuration information.

FIG. 2 is a diagram describing the approved software query information 21. The approved software query information 21 includes information in which regulation IDs 211, software query numbers (approval identifiers) 212, software IDs 213, and verification data D214 are associated. The regulation IDs 211 are identifiers of regulations. The software query numbers 212 are identifiers (identifiers identifying approvals) that are newly given when approval is given in accordance with the regulations when software is updated or the like. The software IDs 213 are identifiers of the software. The verification data D214 is data to be used to verify the integrity of binary data indicated with the software IDs 213. The software IDs 213 includes information (IDs identifying ECUs, names of modules, and the like) identifying types of the software and version information ("v1.0" and the like) of the software. The software IDs may include only the version information, and the information identifying the types of the software may be separately managed. The approved software query information 21 is composed of combinations of the regulation IDs, the software query numbers, and one or more software IDs (information (names) identifying one or more types and the version information). Therefore, associations between regulations by which approval is given and software relating to the approval can be managed while the software is distinguished based on versions.

In the exemplified approved software query information 21, "R7902" that indicates a second series of Traffic Safety and Nuisance Research Institute's Automobile Type Approval Test Standard (TRIAS) R079 (unified regulations relating to approval for vehicles relating to steering devices) is set in a regulation ID 211 in a record indicated by a reference sign D21A, for example. In the record, "R7902001" is set as a software query number 212 indicating a set of software constituting a function associated with the regulations. The record indicates that software IDs of the software constituting the set of the software are "ECU-A v1.0", "ECU-B v1.0", and "ECU-C v1.0".

Returning to FIG. 1, the regulation requirement information 22 includes information indicating details required by regulations for approval. FIG. 1 exemplifies that "PREQ79-1" and "PREQ79-2" are present as the regulation requirement information 22 for complying with "R7902". "PREQ79-1" and "PREQ79-2" correspond to, for example, a requirement "An optical warning is given when a driver does not keep steering control after a time period of up to 15 seconds elapses." and a requirement "The aforementioned signal and an audio warning are given when a driver does not keep steering control after a time period of up to 30 seconds elapses.".

The required vehicle specification 23 includes information indicating a vehicle system's required specification derived from regulations and other requirements. FIG. 1 exemplifies that "SREQ4" and "SREQ5 are present as the required vehicle specification 23. "SREQ4" and "SREQ5 correspond to, for example, a requirement "An optical warning is given when a driver does not keep steering control after a time period of up to 15 seconds elapses." and a requirement "The aforementioned signal and an audio warning are given when a driver does not keep steering control after a time period of up to 30 seconds elapses.".

The vehicle configuration information 24 includes information of architecture, an ECU configuration, a model, and the like that are used to configure a vehicle system.

FIG. 3 illustrates an example of information included in the vehicle configuration information 24. The exemplified vehicle configuration information 24 has a structure in which device IDs that are identifiers of devices mounted in a vehicle are managed in layers (in a tree shape) using, as a root, a model ID that is an identifier given for each vehicle model. In the exemplified vehicle configuration information 24, the model ID can be associated with the device IDs of the devices constituting parts of the model with the model ID. Since a model ID and a device ID are normally given to information (including the required device specification 31, and the design document 32) managed by the device suppliers 3A to 3C illustrated in FIG. 1, the information can be associated with the vehicle configuration information 24.

The system integration verification result report 25 illustrated in FIG. 1 includes various types of information (including a test specification and a test result report) on verification of design details defined in the required vehicle specification 23 and the vehicle configuration information 24. FIG. 1 exemplifies that "TRSREQ 4", "TRPREQ 5", and the like are present as the system integration verification result report 25.

The eligibility verification result report 26 includes various types of information (including a test specification and a test result report) on eligibility verification of functions defined in the regulation requirement information 22. FIG. 1 exemplifies that "TRPREQ 79-1", "TRPREQ 79-2", and the like are present as the eligibility verification result report 26.

The required device specification 31 includes information indicating details required for specifications of devices to be mounted in the vehicle based on the required vehicle specification 23 and the vehicle configuration information 24. FIG. 1 exemplifies that "REQ A-1", "REQ A-2", "REQ A-3", and the like are present as the required device specification 31 of "ECU-A". "REQ A-1", "REQ A-2", and "REQ A-3" correspond to, for example, information "detection (15 seconds)", "detection (30 seconds)", "notification to ECU-B" derived from the foregoing required vehicle specification 23 "SREQ4". FIG. 1 also illustrates required device specifications for ECU-B and ECU-C to achieve the required vehicle specification 23. The required device specification 31 is defined by the vehicle provider 2 and disclosed to the device supplier 3. An overall requirement (for example, "ECU-A requirement v1.0") for the ECU is composed of a combination of the required device specifications ("REQ A-1", "REQ A-2", and "REQ A-3"). Software to be provided from the device supplier 3 to the vehicle provider 2 is associated with this requirement and managed. For example, the software to be provided is a single binary data item, the software is associated with the overall requirement for the ECU.

The design document 32 includes various types of information (including a basic design document, a detailed design document, a test specification document, and a test result) on the design of a device. FIG. 1 exemplifies that design details "DSN A-1", "DSN A-2", "DSN A-3, and the like are managed as the design document 32 (ECU-A design document) of the ECU.

The source code 33 is a source code of software to be embedded in a device. FIG. 1 exemplifies that a source code "a1.c" with a plurality of functions or classes ("Func A-1", "Func A-2", and "Func A-3") and the like are managed as the source code 33.

The unit verification result report 34 includes various types of information (including a test specification and a test result report) on verification on a function basis. FIG. 1 exemplifies that "TRfunc A-1", "TRfunc A-2", "TRfunc A-3", and the like are present as the unit verification result report 34.

The ECU integration verification result report 35 includes various types of information (including a test specification and a test result report) on verification of design details defined in the design document 32. FIG. 1 exemplifies that "TRDSN A-1", "TRDSN A-2", "TRDSN A-3", and the like are present as the ECU integration verification result report 35.

The ECU eligibility verification result report 36 includes various types of information (including a test specification and a test result report) on eligibility verification of functions defined in the required device specification 31. FIG. 1 exemplifies that "TRREQ A-1", "TRREQ A-2", "TRREQ A-3", and the like are present as the ECU eligibility verification result report 36.

The software 37 includes software created based on the required device specification 31. The software is created by the device supplier 3 and provided to the vehicle provider 2. The software includes a binary code describing a control command, data (calibration data or the like) to be used to execute the control command, and verification data to be used to verify the integrity of the binary code and the data. The software 37 is created by compiling the source code 33 of the device supplier 3.

The traceability information 20 is information in which information (hereinafter referred to as "deliverables") created and managed by the vehicle provider 2 is associated. The traceability information 20 includes an association between the regulation requirement information 22 and the required vehicle specification 23, an association between the required vehicle specification 23 and the required device specification 31, an association between the regulation requirement information 22 and the eligibility verification result report 26, an association between the required vehicle specification 23 and the eligibility verification result report 26, and the like.

The traceability information 30 is information in which deliverables created and managed by the device supplier 3 are associated with each other. The traceability information 30 includes an association between the required device specification 31 and the design document 32, an association between the design document 32 and the source code 33, an association between the source code 33 and the unit verification result report 34, an association between the design document 32 and the ECU integration verification result report 35, an association between the required device specification 31 and the ECU eligibility verification result report 36, an association between the required device specification 31 and the software 37, and the like.

FIGS. 4A and 4B illustrate examples of the traceability information (traceability information 20 and 30). For example, the traceability information 20 exemplified in FIG. 4A indicates an association between the required vehicle specification 23 and the required device specification 31. A record indicated by a reference sign 20a indicates that a required vehicle specification "SREQ4 v1.0" is satisfied by required device specifications "REQ A-1 v1.0", "REQ A-2 v1.0", "REQ B-2 v1.0", "REQ B-3 v1.0", "REQ C-1 v1.0", and "REQ C-2 v1.0".

The traceability information 30 exemplified in FIG. 4B indicates an association between the design document 32 and the source code 33. A record indicated by a reference sign 30a indicates that design "DSN A-1 v1.0" is implemented with a function "FUNC A-1 v1.0". In the traceability information 20, IDs are given to required specifications and the like, and associations between the IDs are indicated. As an expression format of the traceability information, there is a tabular form exemplified in FIGS. 4A and 4B or the like.

The information illustrated in FIG. 1 is, for example, managed on a vehicle model basis. The example (information of the device supplier 3A) of the management information of the device supplier 3 of "ECU-A" is described above with reference to FIG. 1. However, the required device specification 31, the design document 32, the source code 33, the unit verification result report 34, the ECU integration verification result report 35, the ECU eligibility verification result report 36, and the software 37 are created and managed for each device supplier 3. For example, the device suppliers 3 of "ECU-B" and "ECU-C" manage information of the device supplier 3B and information of the device supplier 3C, respectively.

Software Query Information Management System

Next, an information processing system (hereinafter referred to as "software query information management system 1") according to the embodiment is described.

FIG. 5 illustrates a schematic configuration of the software query information management system 1. The software query information management system 1 manages the software query information 6 illustrated in FIG. 1 and includes a vehicle provider system 100, one or more device supplier systems 200, a test vehicle managing device 300, a software delivering device 400, and a test result analyzing device 500. The vehicle provider system 100 is an information processing system that is managed by the vehicle provider 2. The one or more device supplier systems 200 are information processing systems that are managed by the device suppliers 3A to 3C. Each of the systems and the devices is configured using one or more information processing devices. It is assumed that information that is included in the software query information 6 illustrated in FIG. 1 and is not illustrated in FIG. 1 is managed in the vehicle provider system 100 or the one or more device supplier systems 200 in such a manner that operations of searching for, updating, and deleting the information can be executed using a database or the like.

The vehicle provider system 100 and the one or more device supplier systems 200 are connected to and able to communicate with each other via a communication network. The vehicle provider system 100 is connected to and able to communicate with the test vehicle managing device 300, the software delivering device 400, and the test result analyzing device 500 via a communication network. Each of the communication networks is configured using a wired or wireless communication infrastructure and is, for example, a wide area network (WAN), a local area network (LAN), a controller area network (CAN), the Internet, a dedicated line, one or more of various public communication networks, or the like.

FIG. 6 illustrates an example of a hardware configuration of an information processing device (computer) constituting each of the vehicle provider system 100, the one or more device supplier systems 200, the test vehicle managing device 300, the software delivering device 400, and the test result analyzing device 500. The exemplified information processing device 10 includes a processor 11, a main storage device 12, an auxiliary storage device 13, an input device 14, an output device 15, and a communication device 16. The devices 11 to 16 are connected to and able to communicate with each other via a communication section such as a bus not illustrated.

The information processing device 10 is, for example, a desktop personal computer, an office computer, a mainframe, a mobile communication terminal (smartphone, tablet, wearable terminal, or the like), a laptop personal computer, or the like. In the information processing device 10, for example, an operating system, a device driver, a file system, a database management system (DBMS) (relational database, NoSQL, or the like), and the like may be introduced. In addition, the information processing device 10 may be achieved using a virtual information processing resource such as a cloud server provided by a cloud system. The vehicle provider system 100 and the one or more device supplier systems 200 may be provided as a cloud service.

The processor 11 is configured using, for example, a central processing unit (CPU), a micro-processing unit (MPU), a graphics processing unit (GPU), an artificial intelligence (AI) chip, a field programmable gate array (FPGA), an application specific integrated circuit (ASIC), or the like.

The main storage device 12 stores a program and data. The main storage device 12 is, for example, a read-only memory (ROM), a random-access memory (RAM), a non-volatile memory (NVRAM), or the like.

The auxiliary storage device 13 is, for example, a solid-state drive (SSD), a hard disk drive, an optical storage device (compact disc (CD), digital versatile disc (DVD), or the like), a storage system, a reading/writing device that reads and writes data from and to a recording medium such as an IC card, or an SD card, or an optical recording medium, a storage region of a cloud server, or the like. A program and data can be read into the auxiliary storage device 13 via a recording medium reading device and a communication device 16. The program and the data that are stored in the auxiliary storage device 13 is read into the main storage device 12 at any time.

The input device 14 is an interface that receives input from an external. The input device 14 is, for example, a keyboard, a mouse, a touch panel, a card reader, an audio input device, or the like.

The output device 15 is an interface that outputs various types of information such as the progress of processing and a result of processing. The output device 15 is, for example, a display device (liquid crystal monitor, liquid crystal display, graphics card, or the like) that visualizes the various types of information, a device (audio output device (speaker or the like)) that converts the various types of information into audio information, a device (printing device or the like) that converts the various types of information into characters, or the like. The output device 15 and the input device 14 constitute a user interface.

For example, the information processing device 10 may be configured to receive and output information from and to another device (smartphone, tablet, laptop computer, one or more of various mobile information terminals, or the like) via the communication device 16.

The communication device 16 achieves communication with another device. The communication device 16 is a wireless or wired communication interface that achieves communication with another device via the communication network. For example, the communication device 16 is a network interface card (NIC), a wireless communication module, a Universal Serial Bus (USB) module, a serial communication module, or the like.

Returning to FIG. 5, functions included in the systems and the devices are described. The vehicle provider system 100 includes a traceability information manager 110, an information manager 111, a regulation information manager 112, a traceability information converter 113, an information integrator 114, a software query number generator 115, a software query information manager 116, a test-related information manager 118, a failure information manager 119, and a software update manager 125. These functions are achieved by reading and executing, by the processor 11 of the information processing device 10 constituting the vehicle provider system 100, the program stored in the main storage device 12, or are achieved by hardware (FPGA, ASIC, AI chip, or the like) of the information processing device 10.

The traceability information manager 110 receives traceability information (traceability information 30' described later) transmitted from the one or more device supplier systems 200 and manages the received traceability information. The traceability information manager 110 manages the traceability information 20 (illustrated in FIG. 1) created by the vehicle provider 2.

The information manager 111 manages the required vehicle specification 23, the vehicle configuration information 24, the required device specification 31, the software 37, the system integration verification result report 25, and the eligibility verification result report 26 that are illustrated in FIG. 1. The information may be separately managed by the information manager 111 using a plurality of engineering tools or may be comprehensively managed by the information manager 111 using a single engineering tool. Therefore, it is sufficient if the information manager 111 can provide required information when necessary.

The regulation information manager 112 manages information (hereinafter referred to as "regulation information 1121") on a regulation that is used for type approval for vehicles. The regulation information 1121 includes the regulation requirement information 22, a template of a document to be submitted to the authority, a submitted document, and the like. The regulation information manager 112 manages not only regulation information of Japan but also regulation information of an export destination (destination country) of vehicles. Information required to gain type approval in the export destination can be obtained from regulation information of the export destination identified in information of the destination country.

The traceability information converter 113 reads the traceability information 30' created in a form created by a device supplier 3 and converts the traceability information 30' into a common expression format (hereinafter also referred to as "common format") able to be used by the vehicle provider. As the common format, there is the Resource Description Framework (RDF), for example.

The information integrator 114 associates information (information managed by each of the information manager 111 and the regulation information manager 112) managed by each of the vehicle provider system 100 and the one or more device supplier systems 200 based on the traceability information 30' converted in the common format and the traceability information 20, thereby generating the regulation requirement information 22, the required vehicle specification 23, the required device specification 31, the design document 32, the source code 33, and vehicle traceability information 40 (information corresponding to all or a part of the software query information 6 illustrated in FIG. 1) in which a regulation ID is associated with information associated with the regulation requirement information 22. By managing the traceability information in the common format such as the RDF format, a query language such as Protocol and RDF Query Language (SPARQL) can be used and a search system that can multi-directionally and flexibly execute a search can be easily achieved.

The software query number generator 115 generates approved software query information 21 based on the vehicle traceability information 40.

The software query information manager 116 associates the vehicle traceability information 40 generated by the information integrator 114 with the approved software query information 21 (corresponding to the approved software query information 21 illustrated in FIG. 1) generated by the software query number generator 114 and manages the vehicle traceability information 40 and the approved software query information 21. Therefore, information that is included in the software query information 6 and relates to software to be embedded in a device is associated with a software query number and a regulation ID. In addition, the software query information manager 116 searches the vehicle traceability information 40 based on a request from a user and returns a result of the search to the user. The software query information manager 116 is described later in detail.

The test-related information manager 118 manages information (information (hereinafter referred to as "test history information 1181" on histories of tests conducted in the past) on tests conducted during development of a device to be mounted in the vehicle, previous maintenance, and the like in the past, and information (hereinafter referred to as "test vehicle information 1182") on the vehicle used for the tests conducted in the past. The test-related information manager 118 provides, to the software query information manager 116 at any time, test information 41 that is information based on the test history information 1181 and the test vehicle information 1182 that are managed by the test-related information manager 118.

FIG. 7 illustrates an example of the test history information 1181. The exemplified test history information 1181 is composed of one or more records each having items, a test ID 811, a test detail 812, a test vehicle configuration 813, a software query number 814, a tool used 815, a test conductor 816, a test result 817, and evidence 818.

Among the foregoing items, in the test ID 811, a test ID that is an identifier given to each test conducted for the vehicle is set. In the test detail 812, information indicating a detail of the test is set. In the test vehicle configuration 813, information (a model ID of the test vehicle, a device ID of a device mounted in the test vehicle, a software ID of software embedded in the device, and the like) indicating a configuration of the test vehicle is set. In the software query number 814, a software query number associated with the test is set. In the tool used 815, information indicating a tool used for the test is set. In the test conductor 816, the name of a person who has conducted the test is set. In the evidence 818, actual evidence obtained when the test is conducted and a location (information indicating a storage location of a URL or the like) of the evidence are set. The evidence is generated by the test result analyzing device 500 and provided to the user via the software query information manager 116. A specific method for generating the evidence is described later.

FIG. 8 illustrates an example of the test vehicle information 1182. The exemplified test vehicle information 1182 includes one or more records each having items, a model ID 821, a vehicle name 822, and a placement site 823. One record of the test vehicle information 1182 corresponds to a single test vehicle.

Among the foregoing items, in the model ID 821, a model ID of the concerned vehicle is set. In the vehicle name 822, the name of the concerned vehicle is set. In the placement site 823, information indicating a site in which the concerned vehicle is placed is set.

Returning to FIG. 5, the failure information manager 119 manages information (hereinafter referred to as "failure information 1191") on a failure (event) that has occurred in a device mounted in the vehicle. The failure information manager 119 provides the failure information 1191 (event information) to the software query information manager 116 and the test result analyzing device 500 at any time. For example, the failure information manager 119 acquires the failure information by communicating with the actual vehicle and a test environment, for example. However, a method for acquiring the failure information is not necessarily limited.

The failure information 1191 is created using the template, included in the regulation information 1121, of a document to be submitted to the authority. For example, software embedded in the device is updated in order to handle a failure registered in the failure information 1191. For example, the failure information 1191 is used to present a detail of a failure to the user at the time of a test of the vehicle and generate evidence after the test is conducted.

FIG. 9 illustrates an example of the failure information 1191. The exemplified failure information 1191 includes one or more records each having items, a failure ID 911, a date and time 912, a vehicle ID 913, a vehicle name 914, a model ID 915, a motor type 916, a detail 917, a device name 918, a device ID 919, a software name 921, a software ID 922, a travel distance 923, a travel route 924, a failure-revealed point 925, weather 926, and supplementary information 927.

Among the foregoing items, in the failure ID 911, a failure ID that is an identifier given to each failure that has occurred in the vehicle is set. In the date and time 912, a date and time when the failure has occurred is set. In the vehicle ID 913, a vehicle ID that is an identifier of the vehicle (hereinafter referred to as "concerned vehicle") in which the failure has occurred is set. In the vehicle name 914, a vehicle name of the concerned vehicle is set. In the model ID 915, a model ID of the concerned vehicle is set. In the motor type 916, the type of a motor mounted in the concerned vehicle is set. In the detail 917, information indicating a detail of the failure is set. In the device name 918, the name of a device (hereinafter referred to as "concerned device") in which the failure has occurred is set. In the device ID 919, a device ID of the concerned device is set.

In the software name 921, the name of software embedded in the concerned device is set. In the software ID 922, a software ID of the software embedded in the concerned device is set. In the travel distance 923, a total travel distance of the concerned vehicle is set. In the travel route 924, information indicating a travel route of the concerned vehicle when the failure occurs is set. In the failure-revealed point 925, information indicating a point where the failure has been revealed is set. In the weather 926, weather when the failure has occurred is set. In the supplementary information 927, supplementary information (information on evidence or the like) on the failure is set.

When software mounted in the vehicle is updated, the software update manager 125 executes a process relating to updates of the vehicle traceability information 40 and the software query information 21. The software update manager 125 receives key information (for example, an identifier (hereinafter referred as function ID") of a function or class that is described in a source code, a regulation ID, a software query number, a software ID, and the like) specifying the software from the user, identifies software query information 6 (vehicle traceability information 40) including the source code including the received key information, and provides information on the identified software query information 6 to the user. The user references the foregoing information and can easily and quickly obtain, for example, information on targets (software, a device, a regulation, and the like) that need to receive approval again, information on a test (verification) that needs to be conducted to receive the approval, information on a result (evidence or the like) of the test, and the like.

Subsequently, functions of each of the device supplier systems 200 illustrated in FIG. 5 are described. As illustrated in FIG. 5, each device supplier system 200 includes an information manager 201, a traceability information manager 202, and a traceability information converter/transmitter 203. These functions are achieved by reading and executing, by the processor 11 of the information processing device 10 constituting the device supplier system 200, the program stored in the main storage device 12 or are achieved by the hardware (FPGA, ASIC, AI chip, or the like) of the information processing device 10.

The information manager 201 illustrated in FIG. 5 manages all or a part (deliverables) of the software query information 6 including the required device specification 31, the design document 32, the source code 33, the unit verification result report 34, the integration verification result report 35, the eligibility verification result report 36, and the software 37 that are (only partially) illustrated in FIG. 1. The foregoing information may be managed by the information manager 111 using a plurality of engineering tools or may be comprehensively managed by the information manager 111 using a single engineering tool. It is sufficient if the information manager 111 can provide required information when necessary.

The traceability information manager 202 manages the traceability information 30 illustrated in FIG. 1.

The traceability information converter/transmitter 203 transmits, to the vehicle provider system 100, the traceability information 30 managed by the traceability information manager 202. In this case, the traceability information converter/transmitter 203 may convert information (for example, a portion (function name or the like) included in the source code and to be kept secret) that is included in the traceability information (traceability information 30) managed by the device supplier 3 and is to be kept secret by the device suppliers 3A to 3C, and may transmit the converted information as traceability information 30' to the vehicle provider system 100. By converting the information in the foregoing manner, it is possible to generate the traceability information of traceability from the request to the source code while keeping secret the information of the device supplier 3. The traceability information converter/transmitter 203 generates and stores a conversion table 38 for the traceability information 30 and the traceability information 30' during the conversion. When the device supplier 3 is requested by the vehicle provider 2 to provide information, the traceability information converter/transmitter 203 inversely converts data using the conversion table 38 and references necessary data, for example.

The test vehicle managing device 300 illustrated in FIG. 5 executes information processing (management of information on a configuration of the test vehicle, reserved processing on the test vehicle, and the like) relating to the provision of the test vehicle that is the vehicle to be used when a test (verification) relating to approval for the vehicle is conducted.

The software delivering device 400 illustrated in FIG. 5 communicates with a gateway device mounted in the vehicle and a server device and executes processing relating to delivery of software to a device mounted in the vehicle and the execution of the software. In addition, the software delivering device 400 provides a result of executing the software to the test result analyzing device 500. The software delivering device 400 communicates with the vehicle provider system 100 and executes various types of information processing (the management of information on a tool to be used for embedding, the reservation of the tool, the transmission of software to the tool, and the like) relating to the embedding of the software in the device mounted in the vehicle.

The test result analyzing device 500 illustrated in FIG. 5 analyzes the result, provided from the software delivering device 400, of executing the software. In addition, the test result analyzing device 500 generates evidence based on data (communication data) indicating communication between devices and transmitted from a bus tracer 60 described later. The test result analyzing device 500 communicates with the vehicle provider system 100 via the communication network to acquire the information (approved software query information 21, failure information 1191, and the like) managed by the vehicle provider system 100 at any time.

Next, a process that is executed in the software query information management system 1 is described.

Process of Generating Software Query Information

Figure 10:
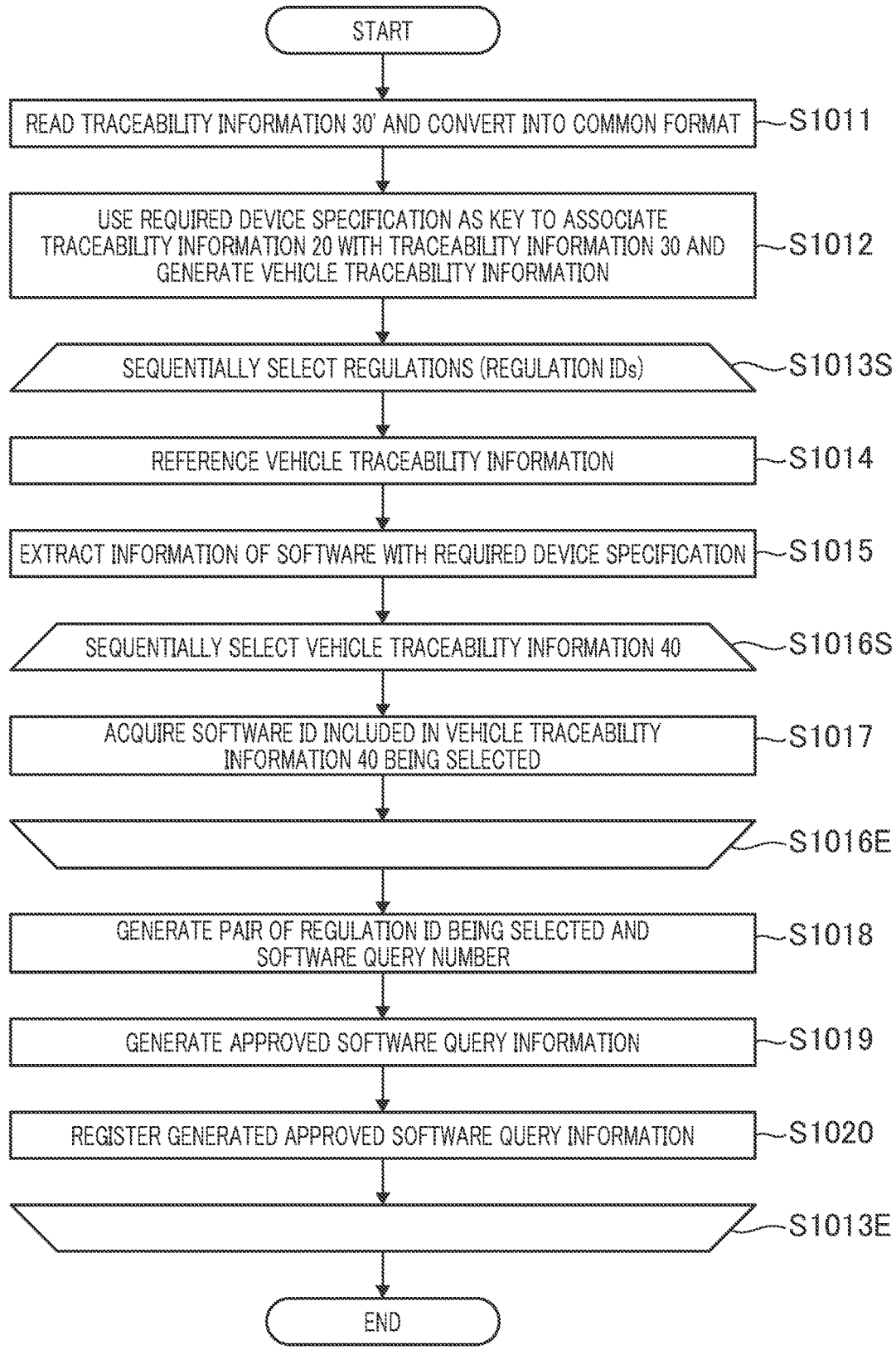
FIG. 10 is a flowchart of a software query number generation process.

FIG. 10 is a flowchart of a process (hereinafter referred to as "software query information generation process S1000") that is executed in the vehicle provider system 100 to generate the software query information 6 (vehicle traceability information 40 and approved software query information 21). The software query information generation process S1000 is described below with reference to FIG. 10.

It is assumed that, at the start time of the software query information generation process S1000, the traceability information manager 110 already manages the traceability information 20 (traceability information created by the vehicle provider 2) and the traceability information 30' (traceability information 30' acquired from the one or more device supplier systems 200). In addition, it is assumed that, at the start time of the software query information generation process S1000, the information manager 111 already manages the required vehicle specification 23, the required device specification 31, and the like. Furthermore, it is assumed that, at the start time of the software query information generation process S1000, the regulation information manager 112 already manages the regulation information 1121 set by the user or the like in advance.

As illustrated in FIG. 10, first, the traceability information converter 113 reads the traceability information 30' in the format created by the device supplier and the converts the traceability information 30' into traceability information in the common format (S1011).

FIG. 11 is a diagram describing the traceability information 30' and the conversion of the traceability information 30'. The traceability information 30' is obtained by converting the traceability information 30 exemplified in FIG. 4 by the traceability information converter/transmitter 203. Traceability information 30'a that is a record of the exemplified traceability information 30' indicates that a required device specification "REQ A-1 v1.0" is satisfied by design "DSN yyy v1.0" and design "DSN zzz v1.0". The design "DSN yyy v1.0" and the design "DSN zzz v1.0" are expressions after the conversion by the traceability information converter/transmitter 203.

Traceability information 30"a illustrated in FIG. 11 is obtained by converting the traceability information 30' by the traceability information converter 113 and is in the common format (RDF format). When the RDF format is used, the information is expressed in a sentence with a subject, a predicate, and an object. In the exemplified traceability information 30"a, "REQ A v1.0" is a subject, the design "DSN yyy v1.0" and the design "DSN zzz v1.0" are objects, "satisfiedby" indicating that "REQ A v1.0" is satisfied by the design "DSN yyy v1.0" and the design "DSN zzz v1.0" is a predicate. In the RDF, these information items are represented by uniform resource identifiers (URLs). By commonly managing the traceability information using the RDF format, the query language SPARQL or the like can be used and related information can be easily searched.

Returning to FIG. 10, the information integrator 114 associates, based on the traceability information 30" converted in the common format and the traceability information 20, information (information managed by each of the information manager 111 and the regulation information manager 112) managed by each of the vehicle provider system 100 and the one or more device supplier systems 200, thereby generating the regulation requirement information 22, the required vehicle specification 23, the required device specification 31, the design document 32, the source code 33, the software 37, and the vehicle traceability information 40 in which a regulation ID is associated with information associated with the regulation requirement information 22 (S1012).

In loop processes S1013S to S1013E, the software query number generator 115 generates the approved software query information 21. The software query number generator 115 sequentially selects a regulation (regulation ID) of the regulation information 1121 managed by the regulation information manager 112 in each loop.

In the loop processes S1013S to S1013E, the software query number generator 115 crosschecks a regulation being selected with the vehicle traceability information 40 managed by the software query information manager 116 (S1014), acquires an ECU associated with the regulation being selected via the required device specification 31, and extracts information of the software 37 with the required device specification 31 implemented therein (S1015). When the regulation is associated with only hardware, the subsequent processes are not executed and the process is terminated.

In loop processes S1016S to S1016E, the software query number generator 115 sequentially selects vehicle traceability information 40 extracted in S1015 and associated with the regulation being selected and acquires software IDs included in the vehicle traceability information 40 being selected (S1017).

When the loop processes S1013S to S1013E are terminated, the software query number generator 115 newly issues a software query number for the regulation being selected and generates a pair of the regulation (regulation ID) being selected and the newly issued software query number (S1018).

Subsequently, the software query information manager 116 associates the pair of the regulation ID generated in S1017 and the software query number with all the software IDs acquired in S1017, thereby generating approved software query information 21 (S1019).

Subsequently, the software query information manager 116 associates all the vehicle traceability information 40 extracted in S1015 with the approved software query information 21 generated in S1019 and stores the vehicle traceability information 40 and the approved software query information 21 as targets to be managed (S1020).

As described above, the vehicle provider system 100 can efficiently generate the software query information 6 (traceability information 40 and approved software query information 21) based on the traceability information 30 transmitted from the one or more device supplier systems 200.

Process of Updating Software Query Information

Figure 12:
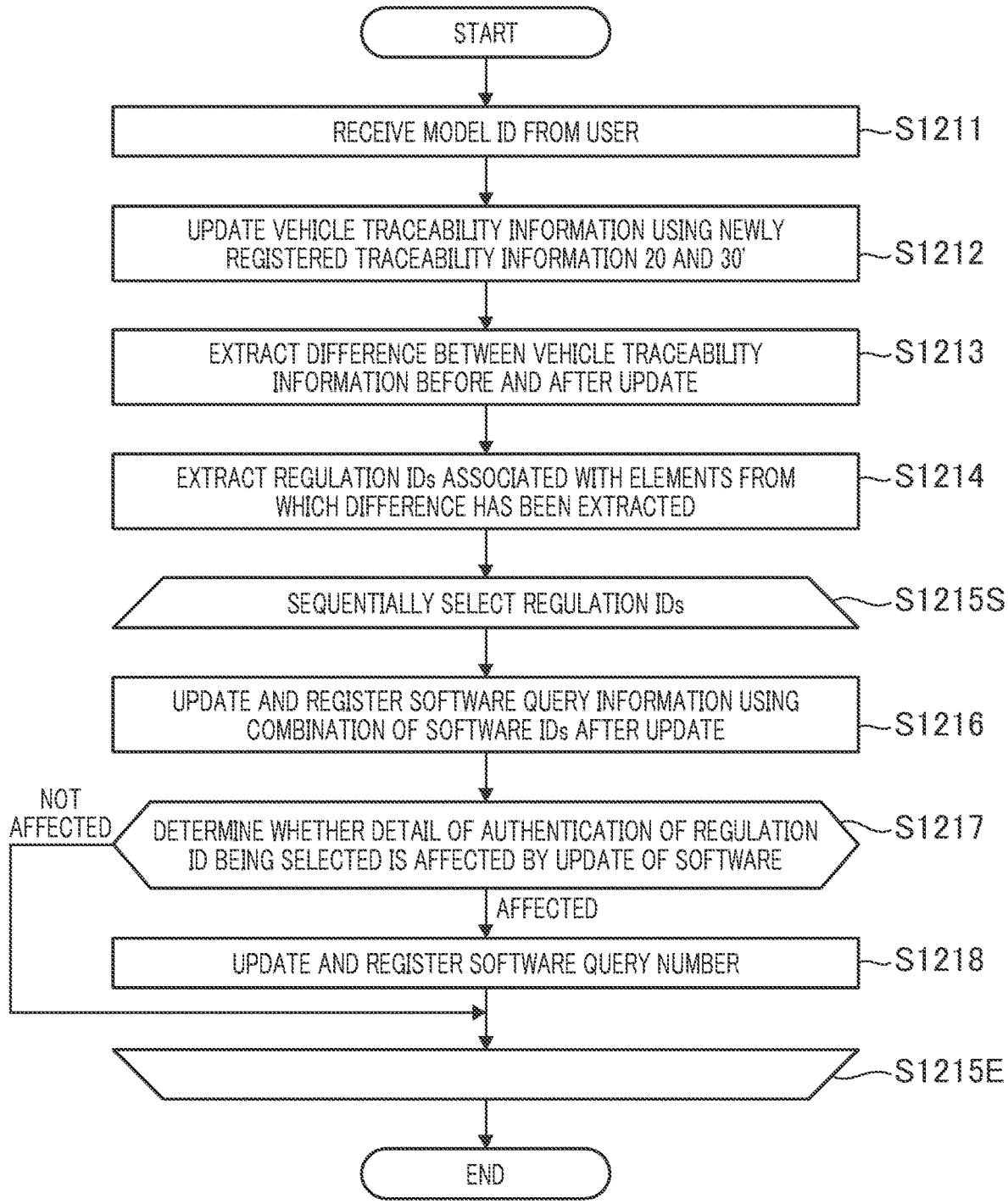
FIG. 12 is a flowchart of a software update management process.

FIG. 12 is a flowchart of a process (hereinafter referred to as "software update management process S1200") that is executed by the software update manager 125 of the vehicle provider system 100 when software embedded in a device is updated. The software update management process S1200 is described with reference to FIG. 12.

It is assumed that, at the start time of the software update management process S1200, the updated traceability information 20 (traceability information created by the vehicle provider) and the traceability information 30' (traceability information acquired from the one or more device supplier systems 200) are already registered in the traceability information manager 110 due to a software update.

First, the software update manager 125 receives a model ID from the user (S1211).

Next, the software update manager 125 updates the vehicle traceability information 40 using the newly registered traceability information 20 and 30' via the traceability information converter 113 and the information integrator 114 (S1212).

Next, the software update manager 125 extracts a difference between the vehicle traceability information 40 before the update and the vehicle traceability information 40 after the update (S1213). The difference is extracted by extracting a difference between versions included in elements of the vehicle traceability information 40 or the like. For example, when a function is modified due to a failure or the like, a difference between the source code 33 before the modification and the source code 33 after the modification occurs and is extracted.

Next, the software update manager 125 extracts regulation IDs associated with the elements from which the difference has been extracted (S1214).

In subsequent loop processes S1215S to S1215E, the software update manager 125 sequentially selects the extracted regulation IDs.

In the foregoing loop processes, first, the software update manager 125 uses a software ID after the update to update the software query information 6 and registers the software query information 6 for a regulation ID being selected (S1216).

Next, the software update manager 125 determines whether a detail of authentication of the regulation ID being selected is affected by the update of the software (S1217). When the detail of the authentication is affected (affected in S1217), the process proceeds to S1218. When the detail of the authentication is not affected (not affected in S1217), the process proceeds to S1215E, a next regulation ID is selected, and the loop processes are executed (S1215S to S1215E). Whether the detail of the authentication is affected is determined by comparing specification information and a verification result that are acquired from the information manager 111 based on the traceability information with a detail described in a submitted document and acquired from the regulation information manager 112 and checking whether the detail of the submitted document needs to be changed. When the detail of the submitted document needs to be changed, the software update manager 125 determines that "the detail of the authentication is affected". When the detail of the submitted document does not need to be changed, the software update manager 125 determines that "the detail of the authentication is not affected".

In S1218, the software update manager 125 updates and registers a software query number associated with the regulation ID being selected.

Therefore, the user can efficiently recognize a software query number that relates to the software update or needs to be updated.

In S1218, for example, various types of information on the vehicle traceability information 40 associated with the approved software query information acquired in S1214 may be presented to the user. Therefore, for example, the user can reference various types of information (including the regulation requirement information 22, the required vehicle specification 23, the required device specification 31, and the design document 32 (including the basic design document, the detailed design document, the test specification document, and the test result) on software that needs to be tested, the source code 33, and a document to be submitted for authentication and efficiently progress a test task.

Process of Referencing Software Query Information

Figure 13:
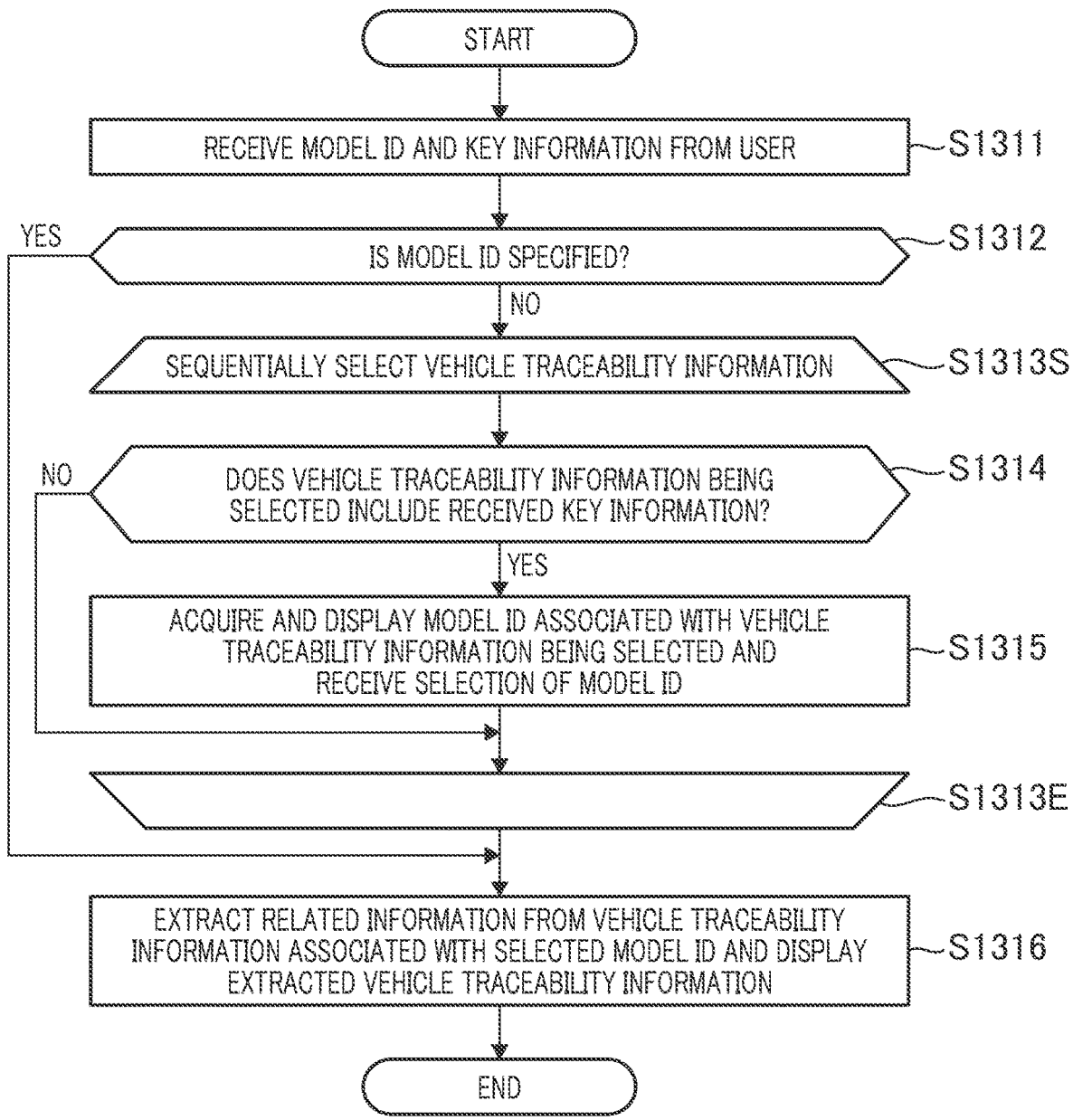
FIG. 13 is a flowchart of a software query information reference process.

FIG. 13 is a flowchart of a process (hereinafter referred to as "software query information reference process S1300") that is executed by the software query information manager 116 to reference software query information. The software query information reference process S1300 is described below with reference to FIG. 13.

First, the software query information manager 116 receives a model ID and information (hereinafter referred to as "key information") as a key from the user (S1311). This example assumes that the reception of the model ID is arbitrary and that the reception of the key information is mandatory.

Next, the software query information manager 116 checks whether the model ID is specified by input from the user (S1312). When the model ID is included (YES in S1312), the process proceeds to S1316. When the model ID is not included (NO in S1312), the process proceeds to S1313S.

In loop processes S1313S to S1313E, the software query information manager 116 sequentially selects vehicle traceability information 40 for each of all registered model IDs.

In the foregoing loop processes, the software query information manager 116 determines whether vehicle traceability information 40 being selected includes the key information received in S1311 (S1314). When the vehicle traceability information 40 includes the key information (YES in S1314), the process proceeds to S1315. When the vehicle traceability information 40 does not include the key information (NO in S1314), the process proceeds to S1313E to select next traceability information 40 and the loop processes S1313S to S1313E are executed.

In S1315, the software query information manager 116 acquires and displays a model ID associated with the vehicle traceability information 40 being selected and receives selection of the model ID.

In S1316, the software query information manager 116 acquires, from vehicle traceability information 40 associated with the model ID input from the user or selected, information (regulation ID, software query number, vehicle requirement, eligibility verification result report, and the like) associated with the foregoing input key information and presents the acquired information to the user (S1316).

Therefore, the user can appropriately specify the key information, easily reference various types of information (including the regulation requirement information 22, the required vehicle specification 23, and the required device specification 31) on software, and use the information to analyze an effect at the time of a software update and efficiently progress a test task.

User Interface

Figure 14:
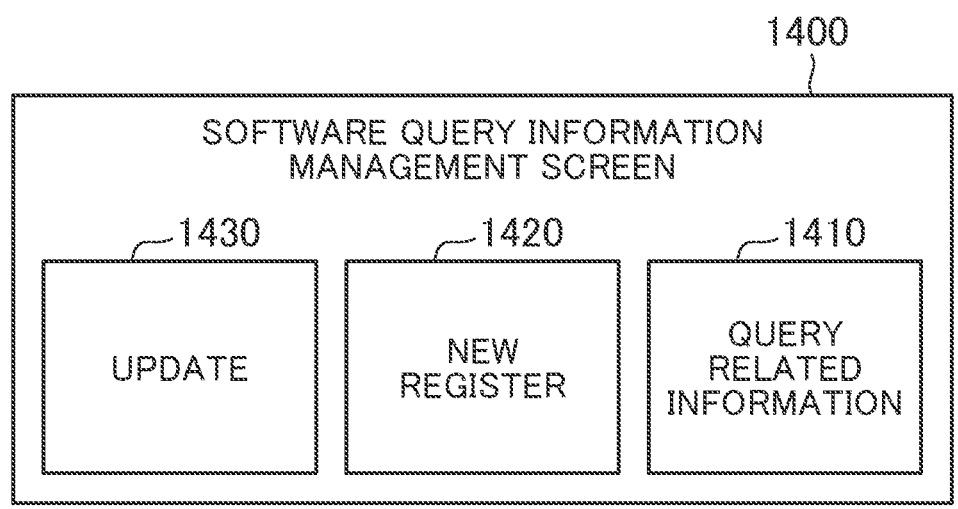
FIG. 14 illustrates an example of a software query information management screen.

FIG. 14 illustrates an example of a menu screen (hereinafter referred to as "software query information management screen 1400") displayed as a user interface by the software query information manager 116. As illustrated in FIG. 14, the exemplified software query information management screen 1400 includes a Query Related-Information button 1410, a New Register button 1420, and an Update button 1430.

When the Query Related-Information button 1410 is operated, the software query information manager 116 displays a related-information query screen 1500 illustrated in FIG. 15. When the New Register button 1420 is operated, the software query information manager 116 displays a software query information new registration screen 1600 illustrated in FIG. 16. When the Update button 1430 is operated, the software query information manager 116 displays a software query information update screen 1700 illustrated in FIG. 17.

As illustrated in FIG. 15, the related-information query screen 1500 includes an entry field 1511 for entering a model ID and key information, a display field 1512 for search results, a test-related information display field 1513, and a display field 1514 for various menus.

When the user enters a model ID and key information in the entry field 1511 and operates a Search button 15111, the software query information manager 116 receives the entered information. The software query information manager 116 uses, for example, vehicle traceability information 40 associated with the entered model ID to acquire various types of information associated with the entered model ID from functions specified in the key information and displays the acquired information in the display field 1512 for search results (the information may be provided as a link destination). When a model ID is not set in the entry field 1511, the software query information manager 116 selects, from all the vehicle traceability information 40, vehicle traceability information 40 including functions associated with the model ID and displays the model ID in the display field 1512 for search results in such a manner that the model ID can be selected.

When a model ID is selected, the software query information manager 116 uses vehicle traceability information 40 associated with the selected model ID to acquire various types of information and displays the acquired information in the display field 1512 for search results. The various types of information include, for example, a regulation ID 211, a software query number 212, a software ID 213, the required vehicle specification 23, the system integration verification result report 25, the eligibility verification result report 26, the required device specification 31, the design document 32, the source code 33, the unit verification result report 34, the ECU integration verification result report 35, and the ECU eligibility verification result report 36.

In the test-related information display field 1513, a Reserve Vehicle button 15131, a Reserve Tool button 15132, and a Setup button 15133 are provided.

For example, the user operates the Reserve Vehicle button 15131 to reserve a test vehicle (and specify a date and time, a test location, and a vehicle type (type) and specify an alternative vehicle when an appropriate test vehicle cannot be secured). For example, when the Reserve Vehicle button 15131 is operated, the software query information manager 116 transmits, to the test vehicle managing device 300, test information 41 associated with approved software query information 21 included in information displayed in the display field 1512 for search results. When the test vehicle managing device 300 receives the foregoing test information 41, the test vehicle managing device 300 executes a process of reserving the test vehicle based on the test information 41 and transmits, to the software query information manager 116, a result (information on the reservation) of the process. When the software query information manager 116 receives the result, the software query information manager 116 presents a detail (reservation status or the like) of the result to the user.

For example, when the user operates the Reserve Tool button 15132, the user can reserve a tool to be used for the test (and specify a date and time, the type of the tool, the number of tools, and the like). When the Reserve Tool button 15132 is operated, the software query information manager 116 transmits, to the software delivering device 400, test information 41 (information on the tool) associated with approved software query information 21 included in information displayed in the display field 1512 for search results. When the software delivering device 400 receives the foregoing test information 41, the software delivering device 400 executes a process of reserving the tool based on the test information 41 and transmits a result (information on the reservation) of the process to the software query information manager 116. When the software query information manager 116 receives the result, the software query information manager 116 presents a detail (reservation status or the like) of the result to the user.

When the user operates the Setup button 15133, a setup task (for example, the transmission of a program to the software delivering device 400, the loading of the program to the tool, and the like) necessary for the test is automatically executed. When the Setup button 15133 is operated, the software query information manager 116 transmits, to the software delivering device 400, a program associated with approved software query information 21 included in information displayed in the display field 1512 for search results and a program identified from information relating to software and included in the test information 41 associated with the approved software query information 21. When the software delivering device 400 receives the programs, the software delivering device 400 writes the received programs to devices in which the programs are to be embedded.

In the display field 1514 for the various menus, a Register button 15141 for registering various types of information and a Generate button 15142 for generating evidence are provided. When the user operates the Register button 15141 for registering various types of information, the user can register, as targets to be managed by the software query information manager 116, new information (approved software query information 21, vehicle traceability information 40, test information 41, and the like) associated with software to be updated. For example, when the user operates the Generate button 15142 for generating evidence, the test-related information manager 118 generates evidence (for example, evidence relating to updated software) based on the test information 41 and inputs the evidence to the software query information manager 116.

As described above, according to the software query information management system 1 according to the present embodiment, when the user updates software, software that needs to be tested for approval due to the update can be efficiently and reliably identified. For example, when software is shared across multiple vehicle models, software that needs to be tested can be identified across the multiple vehicle models. In addition, the user can use output approved software query information 21 to efficiently acquire traceability information and evidence that need to be reported to the authority.

Figure 16:
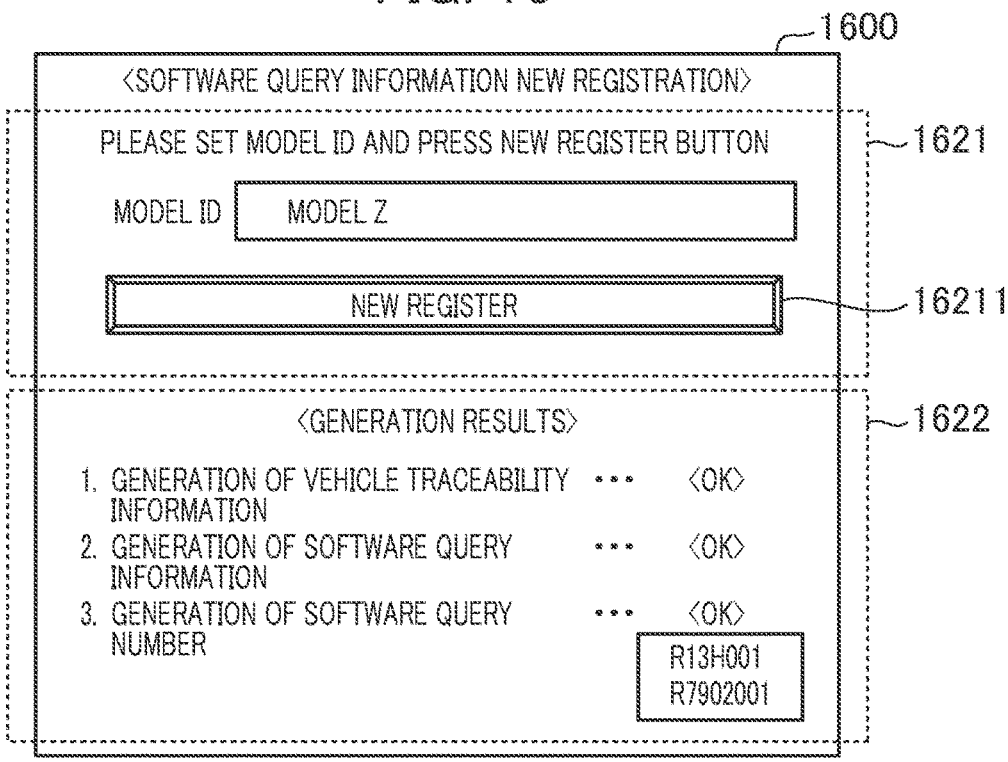
FIG. 16 illustrates an example of a software query information new registration screen.

As illustrated in FIG. 16, the software query information new registration screen 1600 includes a model ID entry field 1621 and a display field 1622 for generation results.

When the user enters a model ID in the model ID entry field 1621 and operates a New Register button 16211, the software query information manager 116 receives the model ID.

The software query information manager 116 uses traceability information 20 and 30' associated with the entered model ID to generate vehicle traceability information 40 together with the traceability information converter 113 and the information integrator 114. In addition, the software query number generator 115 generates software query information and a software query number.

The software query information manager 116 outputs the result of the generation process and the generated software query number to the display field 1622 for generation results.

As described above, according to the software query information management system 1 according to the present embodiment, when a vehicle is newly developed, the user can generate software query information and efficiently give numbers to a set of software necessary for approval and software query numbers of the software.

Figure 17:
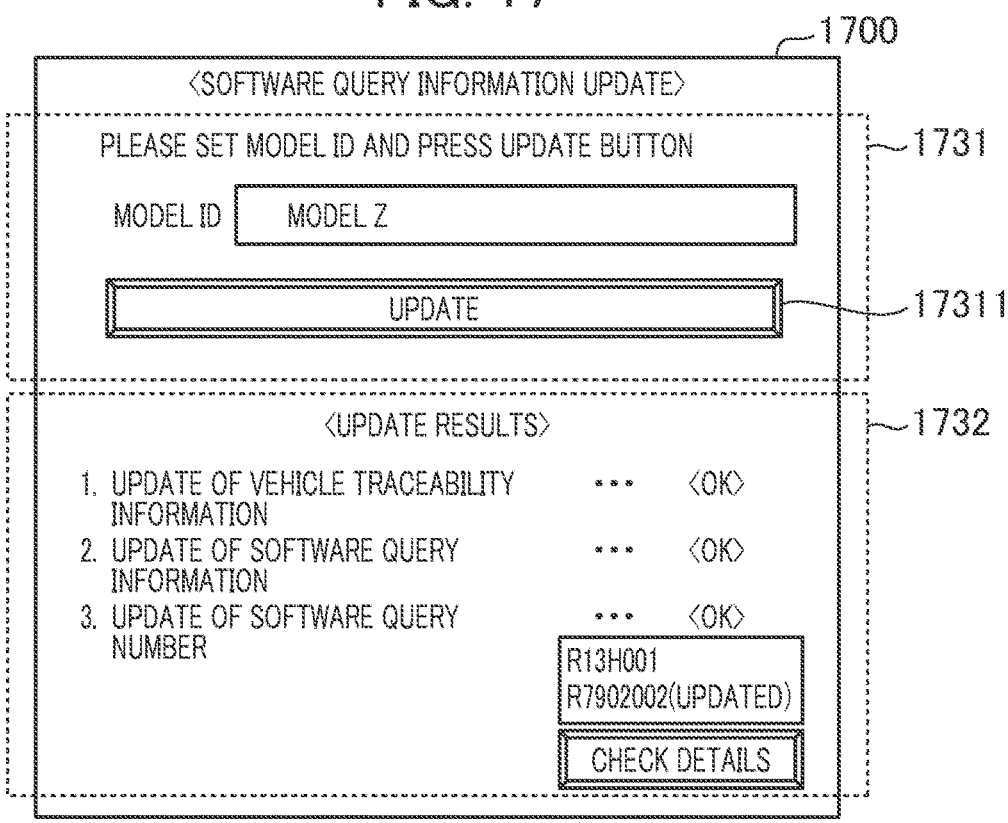
FIG. 17 illustrates an example of a software query information update screen.

As illustrated in FIG. 17, the software query information update screen 1700 includes a model ID entry field 1731 and a display field 1732 for update results.

When the user enters a model ID in the model ID entry field 1731 and operates an Update button 17311, the software query information manager 116 receives the entered model ID.

The software query information manager 116 uses traceability information 20 and 30' associated with the entered model ID to update the vehicle traceability information 40 together with the traceability converter 113 and the information integrator 114. Next, the software update manager 125 updates the software query information and a software query number.

The software query information manager 116 displays the results of the update process and the updated software query number in the display field 1732 for update results. In this example, information indicating that the traceability information 40, the software query information, and the software query number have been successfully updated is displayed, "R13H001" is displayed as a software query number indicating software that may be affected by the location of a change and has not been updated, and "R7902002 (updated)" is displayed as a software query number actually affected and updated.

Figure 18:
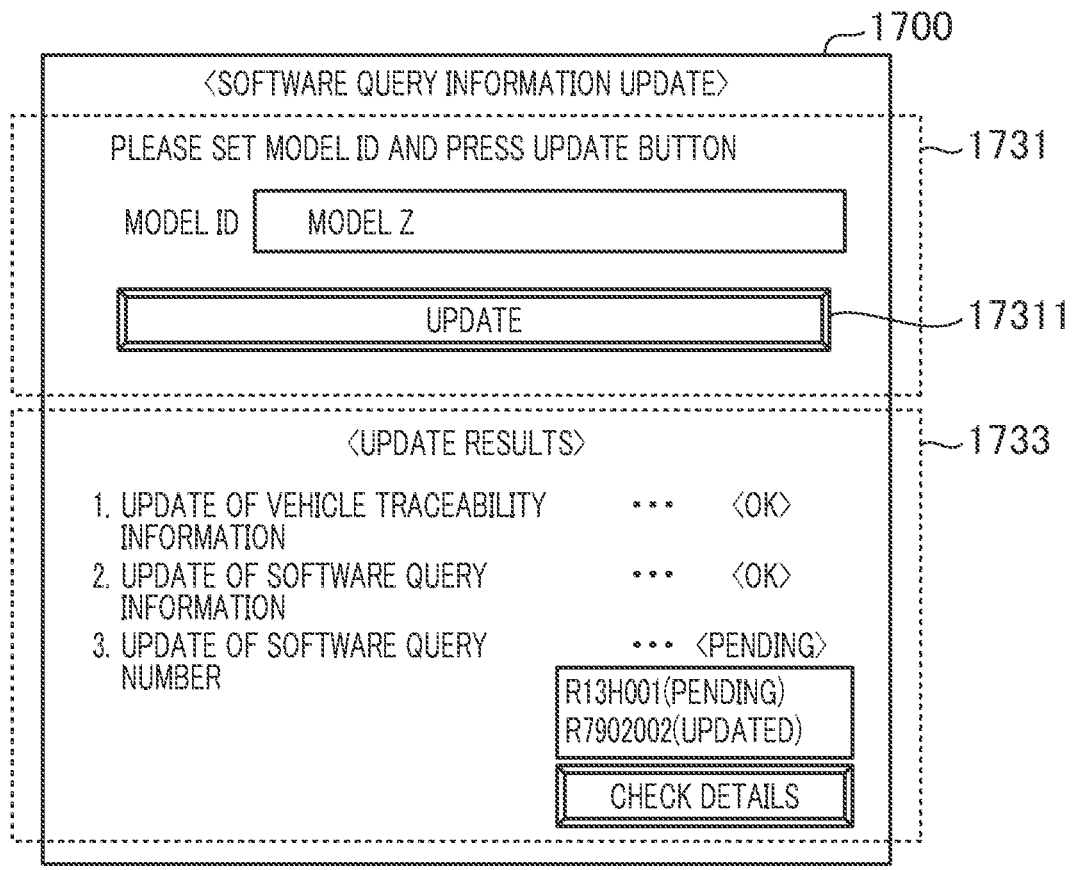
FIG. 18 illustrates a display example when it cannot be determined whether a software query number is to be updated.

FIG. 18 illustrates a display example when it cannot be determined whether a software query number is to be updated in the software query information management system 1 at the time of an update of the software query information 6. In the example illustrated in FIG. 18, the screen has the same configuration as described above, except for an update result display field 1733. As indicated in the update result display field 1733 illustrated in FIG. 18, when it cannot be determined whether a software query number is to be updated, the software query information manager 116 displays the vehicle traceability information 40, information indicating that the software query information has been successfully updated, and information indicating that the update of the software query number is pending. In addition, the software query information manager 116 displays "R13H001(Pending)" indicating that software may be affected by the location of a change and that it cannot be determined whether the software query number is to be updated. The software query information manager 116 displays "R7902002(updated)" as a software query number actually affected and updated.

As described above, according to the software query information management system 1 according to the present embodiment, when software is updated, the user can update software query information and efficiently update a set of software necessary for approval and software query numbers of the software.

As described above in detail, according to the software query information management system 1 according to the present embodiment, the software query information 6 can be managed using the software query information 21 in a unified manner, and it is possible to efficiently manage information on legal approval for software to be embedded in a device mounted in the vehicle.

Use of System

Figure 19:
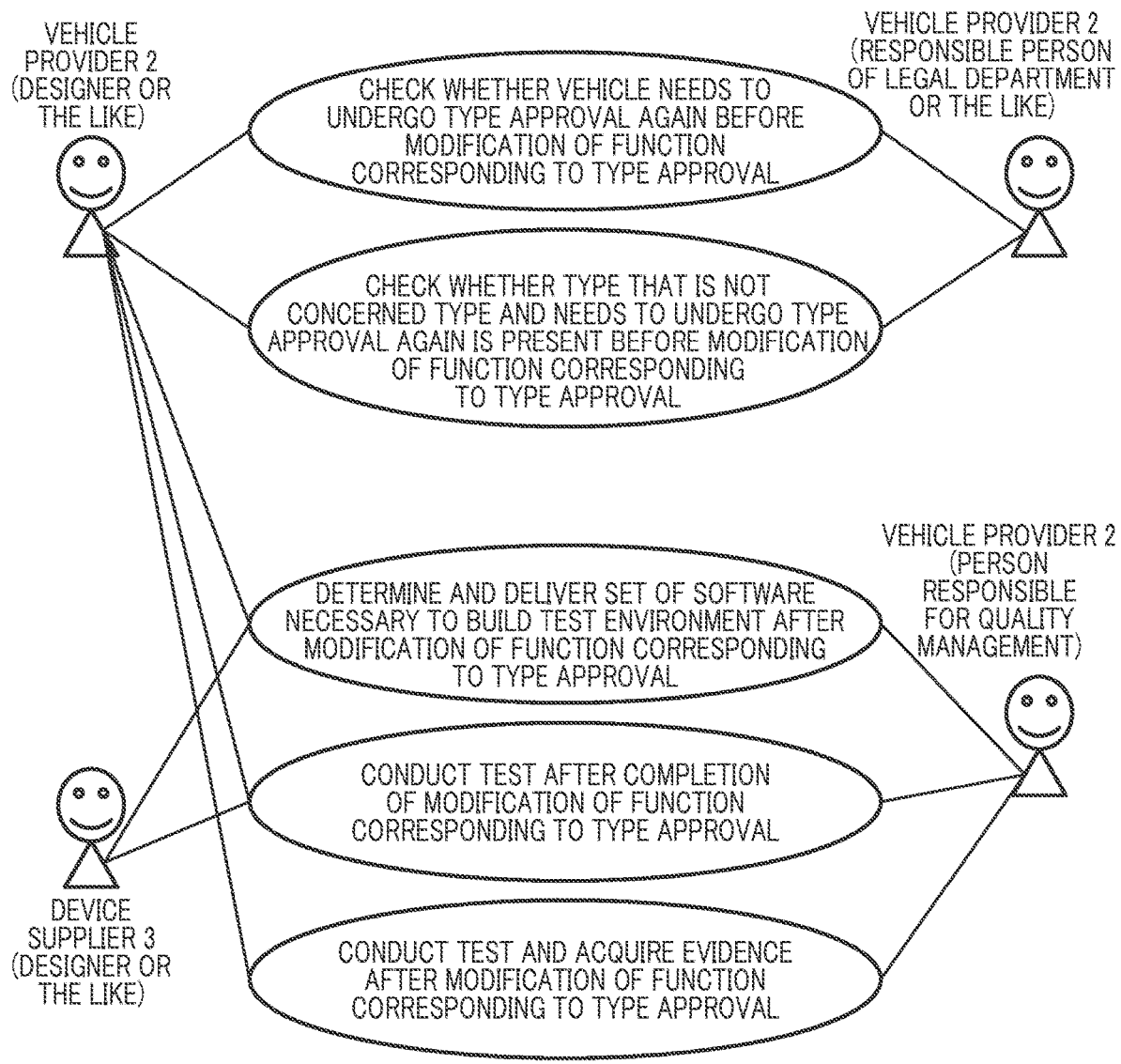
FIG. 19 is a diagram describing the use of the software query information management system.

FIG. 19 is a diagram illustrating the use (use case) of the software query information management system 1 described above.

For example, before a function corresponding to type approval is modified, a designer or a responsible person of a legal department in the vehicle provider 2 (OEM or the like) uses the software query information management system 1 for the purpose of checking whether the vehicle needs to undergo the type approval again and of checking whether a type that is not the type of the foregoing vehicle and needs to undergo the type approval is present.

For example, after the function corresponding to the type approval is modified, the designer or the responsible person of the legal department in the vehicle provider 2 (OEM or the like) or a designer of the device supplier 3 uses the software query information management system 1 for the purpose of determining and delivering a set of software necessary to build a test environment and of conducting a test after the completion of the modification of the function corresponding to the type approval.

For example, after the function corresponding to the type approval is modified, a designer or a person responsible for quality management in the vehicle provider 2 (OEM or the like) uses the software query information management system 1 for the purpose of conducting a test and acquiring evidence.

The software query information management system 1 can be used for various purposes and the user can quickly provide information required by the user.

Test Environment

Figure 20:
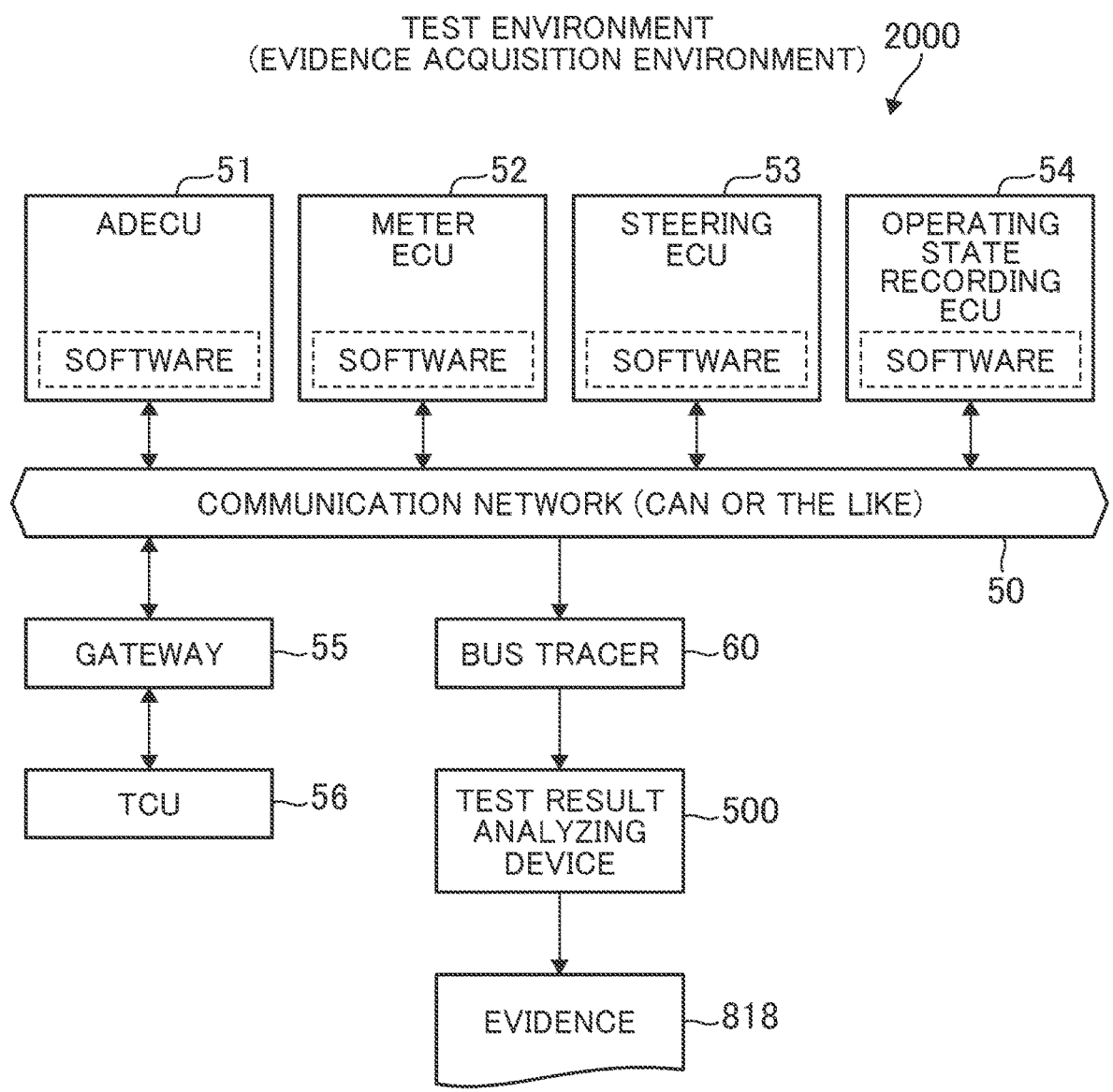
FIG. 20 illustrates an example of a test environment built to acquire evidence.

FIG. 20 illustrates an example of a test environment (evidence acquisition environment) built by the vehicle provider 2 (OEM or the like) or the device supplier (supplier or the like) to acquire evidence. As illustrated in FIG. 20, the exemplified test environment 2000 includes one or more devices 51 to 54 (autonomous driving ECU (ADECU), meter ECU, steering ECU, and operating state recording ECU in this example) to which software (from which evidence is to be acquired) to be tested is delivered and in which the software is executed, a telematics control unit 56 (TCU) that comprehensively controls the devices 51 to 54 and can be connected to a mobile communication network or the like, a bus tracer 60, and a test result analyzing device 500. These devices are connected to and able to communicate with each other via a communication network 50 such as a CAN. The TCU 56 is connected to the communication network 50 via a gateway 55.

The device 51 (ADECU) executes information processing relating to monitoring and control of automatic driving. The device 52 (meter ECU) includes a user interface that receives information for a driver and provides the information to the driver. The device 52 constitutes, for example, an in-vehicle infotainment (IVI) system. The device 53 (steering ECU) executes information processing relating to control of steering of a vehicle. The device 54 (operating state recording ECU) executes information processing relating to collection and recording (collection and recording of log information and the like) of information on an operating state of each section (each function) of the vehicle. The devices 51 to 54 illustrated in FIG. 20 are an example. The test environment 2000 may include components (transmission ECU, engine control ECU, and the like) that execute other types of control.

The bus tracer 60 is configured using an information processing device having a communication device. The bus tracer 60 acquires (captures) communication data (packet) that flows via the communication network 50. The bus tracer 60 inputs the acquired communication data to the test result analyzing device 500. The test result analyzing device 500 generates evidence based on the input communication data and transmits the generated evidence to the vehicle provider system 100 via the communication network.

The functions of the test result analyzing device 500 may be functions of the vehicle provider system 100 or functions of the one or more device supplier systems 200. The functions of the test result analyzing device 500 and the functions of the bus tracer 60 may be implemented in a vehicle or a test bed. The functions of the test result analyzing device 500 may be achieved by components distributed in a vehicle, a test bed, and the like and constituting the vehicle provider system 100, the device supplier system 200, and the test environment 2000.

Generation of Evidence

FIG. 21 is a flowchart of a process (hereinafter referred to as "evidence generation process S2100") of automatically generating evidence by the vehicle provider system 100 using information acquired in the test environment 2000 in the software query information management system 1. The evidence generation process S2100 is described below with reference to FIG. 21.

The failure information manager 119 of the vehicle provider system 100 acquires failure information (event information) from an actual vehicle or the test environment at any time and stores the acquired failure information as failure information 1191 (S2111). The failure information manager 119 provides the failure information 1191 to the test result analyzing device 500 via the communication network at any time. As illustrated in FIG. 9, the failure information 1191 includes information in which information (device name 918 and device ID 919) identifying a failed device is associated with information (software name 921 and software ID 922) identifying software embedded in the concerned device.

The test result analyzing device 500 crosschecks the failure information 1191 provided from the failure information manager 119 with the approved software query information 21 and identifies a regulation ID associated with the software ID 922 indicated in the failure information 1191 (S2112).

Subsequently, the test result analyzing device 500 identifies another software ID associated with the identified regulation ID based on the approved software query information 21 (S2113). The test result analyzing device 500 acquires the approved software query information 21 at any time by, for example, communicating with the vehicle provider system 100 via the communication network.

Subsequently, the test result analyzing device 500 identifies a device having embedded therein the software with the software ID identified in S2113 (S2114). The test result analyzing device 500 acquires the vehicle traceability information 40 by, for example, communicating with the vehicle provider system 100 via the communication network.

Subsequently, the test result analyzing device 500 acquires communication data on the device identified in S2114 from the bus tracer 60 (S2115). The communication data includes, as header information or the like, information identifying a transmission source of the concerned communication data and information identifying a transmission destination of the communication data.

Subsequently, the test result analyzing device 500 generates evidence based on the communication data acquired in S2115 and transmits the generated evidence to the test-related information manager 118 via the communication network (S2116). The test-related information manager 118 stores the transmitted evidence as evidence 818 of the test history information 1181.

FIG. 22 is a sequence diagram describing a process (hereinafter referred to as "communication data acquisition process S2200") that is executed by the bus tracer 60 in the test environment 2000 exemplified in FIG. 20 when the bus tracer 60 acquires communication data. In the exemplified communication data acquisition process S2200, the bus tracer 60 acquires communication data on an operation of the automatic driving function mainly executed by the device 51 (ADECU).

As illustrated in FIG. 22, when the device 51 (ADECU) starts operating, communication data indicating the start of the operation is transmitted from the device 51 (ADECU) to the device 54 (operating state recording ECU) via the communication network 50 (S2211), and the device 54 (operating state recording ECU) receives the communication data and records the detail of the communication data (or causes the detail of the communication data to be stored in the storage device. The same applies below).

After that, when the device 51 (ADECU) detects that a travel environment has changed (for example, weather has changed and a state of a road surface has changed), communication data indicating the change in the travel environment is transmitted from the device 51 (ADECU) to the device 54 (operating state recording ECU) via the communication network 50 (S2212), and the device 54 (operating state recording ECU) receives the communication data and records the detail of the communication data.

Subsequently, the device 51 (ADECU) transmits, to the device 52 (meter ECU), communication data including a warning output start instruction to prompt a driver to take over driving (switch to manual driving) (S2213), and the device 52 (meter ECU) receives the communication data and outputs an alarm (or displays the alarm, outputs an audio alarm, or the like).

Subsequently, the device 51 (ADECU) transmits, to the device 54 (operating state recording ECU) via the communication network 50, communication data indicating that the alarm has been activated (S2214), and the device 54 (operating state recording ECU) receives the communication data and records the detail of the communication data.

Subsequently, the device 51 (ADECU) transmits, to the device 54 (operating state recording ECU) via the communication network 50, communication data indicating a reason (cause) (for example, a center line of a road cannot be detected or the like) that the driver has been prompted to take over driving (S2215), and the device 54 (operating state recording ECU) receives the communication data and records the detail of the communication data.

Subsequently, the device 53 (steering ECU) transmits, to the device 51 (ADECU) via the communication network 50, communication data indicating that the device 53 has detected that the driver has started manually driving (S2216), and the device 51 (ADECU) receives the communication data. The device 53 (steering ECU) transmits, to the device 54 (operating state recording ECU) via the communication network 50, communication data indicating that the automatic driving has been stopped and that the manual driving has been started (S2217), and the device 54 (operating state recording ECU) receives the communication data and records the detail of the communication data.

Subsequently, the device 53 (steering ECU) transmits, to the device 52 (meter ECU), communication data including an instruction to stop outputting the alarm (S2218), and the device 52 (meter ECU) receives the communication data and stops outputting the alarm. In addition, the device 53 (steering ECU) transmits, to the device 54 (operating state recording ECU) via the communication network 50, communication data indicating that the output of the alarm has been stopped (S2219), and the device 54 (operating state recording ECU) receives the communication data and records the detail of the communication data.

In the foregoing sequence, the bus tracer 60 acquires (captures) communication data that flows via the communication network 50, and inputs the acquired communication data to the test result analyzing device 500.

FIG. 23 illustrates an example (each row corresponds to one communication data item) of the communication data acquired by the bus tracer 60 and input to the test result analyzing device 500 in the foregoing sequence. The test-related information manager 118 generates evidence 818 based on the communication data input from the test result analyzing device 500. The communication data may be recorded in a process of generating the evidence in order to execute ex-post analysis on the communication data. As exemplified in FIG. 23, the communication data includes information (hereinafter referred to as "timestamps") indicating a date and time when the communication data has been transmitted from the transmission source to the transmission destination. For example, by comparing time intervals (timing) at which communication data has been newly acquired with time intervals (timing) at which communication data has been acquired in the past, it is possible to detect a failure, detect a sign of the failure, determine whether a warning is to be output, and the like.

As described above, according to the software query information management system 1 according to the present embodiment, the evidence 818 can be efficiently generated using information acquired in the test environment 2000. The foregoing method for generating the evidence is an example, and the evidence may be acquired using another method. In addition, the evidence is generated based on information on an event that is a failure, but may be generated based on information on an event that is not a failure.

Although the embodiments of the present invention are described above in detail, the present invention is not limited to the foregoing embodiments and includes various modifications and equivalent configurations without departing from the gist of the appended claims. For example, the embodiments are described above in detail to clearly explain the present invention, and the present invention is not limited to all the configurations described above. A part of a configuration described in a certain one of the embodiments may be replaced with a configuration described in another one of the embodiments. In addition, a configuration described in a certain one of the embodiments may be added to a configuration described in another one of the embodiments. A configuration may be added to, removed from, or replaced with a part of a configuration described in each of the embodiments.

In the description of the present invention, the ECUs are exemplified as components. However, a regulation requirement and a system requirement may be configured by causing not only the in-vehicle ECUs but also a server device installed outside a vehicle to coordinate with each other. In this case, the system requirement is decomposed into a requirement for the server device and a requirement for the vehicle. The requirement for the vehicle is composed into requirements for the ECUs. However, when the requirement is for the server device, and the foregoing required device specification 31 is treated as the requirement for the server device, it may be considered that the same management can be performed. That is, an effect on approval or the like can be analyzed in a unified manner for a function that is shared by the vehicle and the server device.

In the present invention described above, the traceability information converter 113 is arranged in the vehicle provider system 100, but may be arranged in the traceability information converter/transmitter 203 of each of the one or more device supplier systems 200. In this case, the vehicle supplier can receive the traceability information in a unified format.

In addition, a part or all of the foregoing configurations, functions, processing sections, processing units, and the like may be achieved by hardware, for example, by designing integrated circuits or the like, or may be achieved by software, for example, by causing a processor to interpret and execute a program that achieves the functions.

Information of the program that achieves the functions, a table, a file, and the like can be stored in a storage device such as a memory, a hard disk, or a solid-state drive (SSD), or a storage medium such as an integrated circuit (IC) card, an SD card, or digital versatile disc (DVD).

Control lines and information lines that are considered to be necessary for the description are illustrated, and all control lines and information lines that are necessary for implementation may not be necessarily illustrated. In practice, it may be considered that almost all the configurations are connected to each other.

What is claimed is:

1. An information processing system, comprising:
   a processor;
   a memory coupled to the processor;
   a test environment, including a plurality of electronic control units (ECUs), including an autonomous driving ECU, which are coupled to a communication network, and a bus tracer coupled to the communication network,
   wherein the memory stores instructions that when executed by the processor, configures the processor to:
   associate a required device specification that is information of a specification required for a device mounted on a vehicle in accordance with a regulation with a regulation identification (ID), which is information identifying the regulation that defines a requirement for receiving legal approval for the vehicle, and store the required device specification in association with the regulation ID,
   acquire traceability information, which is information of traceability of the device associated with the required device specification and includes a software ID identifying software embedded in the device, generate software query information in which the regulation ID associated with the required device specification associated with the acquired traceability information is associated with two or more software IDs, store event information of an event that has occurred in the device, the event information including information identifying the device in which the event has occurred associated with a software ID of the software configured to achieve the function of the device, identify, based on the software query information, the software ID of another software associated with the regulation ID associated with the software ID included in the event information, identify, based on the traceability information, the device having embedded therein the software with the identified another software ID, acquire communication data, from the bus tracer, including details of communication executed between the identified device and another device, and generate, based on the communication data, evidence for legal approval, which is a log, a file or a storage location of the evidence, wherein the bus tracer acquires the communication data based on communications occurring via the communication network, the communication data indicating actions by one or more of the plurality of ECUs coupled to the communication network.

2. The software query information management system according to claim 1, wherein the software ID includes information identifying a type of the software and version information.

3. The software query information management system according to claim 1, wherein the processor is configured to generate and manage a software query number that is information in which the regulation ID is associated with the one or more software IDs for each of combinations of one or more vehicle models, the one or more devices, and the one or more regulations.

4. The software query information management system according to claim 1, wherein the traceability information includes a source code of the software, wherein the software query information is information in which the software query number is associated with the traceability information, and wherein the processor is further configured to:

receive key information identifying the source code or a function that is a portion of the source code, and identify, based on the software query information associated with the identified software query number, the software ID of the other software associated with the regulation ID associated with the software ID included in the event information.

5. The software query information management system according to claim 4, wherein the key information is an identifier of the function described in the source code or an identifier of the required device specification.

6. The software query information management system according to claim 4, wherein the processor is configured to identify one or more software IDs included in the traceability information of the identified one or more software query numbers as the software ID of the other software.

7. A software query information management method of an information processing system including a processor, a memory coupled to the processor, a test environment, including a plurality of electronic control units (ECUs), including an autonomous driving ECU, which are coupled to a communication network, and a bus tracer coupled to the communication network, the method comprising:

associating a required device specification that is information of a specification required for a device mounted on a vehicle in accordance with a regulation with a regulation ID, which is information identifying the regulation that defines a requirement for receiving legal approval for the vehicle, and storing the required device specification in association with the regulation ID;

acquiring traceability information, which t is information of traceability of the device associated with the required device specification and includes a software ID identifying software embedded in the device;

generating software query information in which the regulation ID associated with the required device specification associated with the acquired traceability information is associated with the two one or more software IDs;

storing event information of an event that has occurred in the device, the event information including information identifying the device in which the event has occurred associated with a software ID of the software configured to achieve the function of the device;

identifying, based on the software query information, the software ID of another software associated with the regulation ID associated with the software ID included in the event information;

identifying, based on the traceability information, the device having embedded therein the software with the identified another software ID;

acquiring, from the bus tracer, communication data including details of communication executed between the identified device and another device;

generating, based on the communication data, evidence for legal approval, which is a log, a file or a storage location of the evidence; and acquiring, by the bus tracer, the communication data based on communications occurring via the communication network, the communication data indicating actions by one or more of the plurality of ECUs coupled to the communication network.

8. The software query information management method according to claim 7, wherein the software ID includes information identifying a type of the software and version information.

9. The software query information management method according to claim 7, further comprising:

generating and managing a software query number that is information in which the regulation ID is associated with the one or more software IDs for each of combinations of one or more vehicle models, the one or more devices, and the one or more regulations.

10. The software query information management method according to claim 9, wherein the traceability information includes a source code of the software, wherein the software query information is information in which the software query number is associated with the traceability information, wherein the software query information management method further comprises:

receiving key information identifying the source code or a function that is a portion of the source code; and identifying, based on the software query information associated with the identified software query number, the software ID of the other software associated with the regulation ID associated with the software ID included in the event information.

11. The software query information management method according to claim 10,
wherein the key information is an identifier of the function described in the source code or an identifier of the required device specification.

12. The software query information management method according to claim 10, further comprising:
identifying one or more software IDs included in the traceability information of the identified one or more software query numbers as the software ID of the other software.

\* \* \* \* \*